(12) United States Patent
Muraishi

(10) Patent No.: US 9,369,610 B2
(45) Date of Patent: Jun. 14, 2016

(54) IMAGE PROCESSING APPARATUS AND IMAGE PROCESSING METHOD

(71) Applicant: CANON KABUSHIKI KAISHA, Tokyo (JP)

(72) Inventor: Masaaki Muraishi, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/835,171

(22) Filed: Aug. 25, 2015

(65) Prior Publication Data

US 2016/0072982 A1    Mar. 10, 2016

(30) Foreign Application Priority Data

Sep. 9, 2014   (JP) .................................. 2014-183500

(51) Int. Cl.
| | |
|---|---|
| *G06K 15/00* | (2006.01) |
| *H04N 1/40* | (2006.01) |
| *H04N 1/409* | (2006.01) |
| *H04N 1/405* | (2006.01) |
| *G06K 15/02* | (2006.01) |

(52) U.S. Cl.
CPC .......... *H04N 1/4092* (2013.01); *G06K 15/1878* (2013.01); *G06K 15/1881* (2013.01); *H04N 1/40018* (2013.01); *H04N 1/40062* (2013.01)

(58) Field of Classification Search
CPC ............ H04N 1/4092; H04N 1/40018; H04N 1/40062; G06K 15/1878; G06K 15/1881
See application file for complete search history.

(56) References Cited

U.S. PATENT DOCUMENTS

| 7,973,977 B2 * | 7/2011 | Thurston, III ........... G06T 5/005 345/611 |
| 8,705,118 B2 * | 4/2014 | Smith ................... G06F 3/1204 358/1.1 |
| 2007/0133019 A1 * | 6/2007 | Hill ........................ G06K 15/02 358/1.9 |

FOREIGN PATENT DOCUMENTS

| JP | 11-055503 A | 2/1999 |
| JP | 2007-036699 A | 2/2007 |

* cited by examiner

*Primary Examiner* — Quang N Vo

(74) *Attorney, Agent, or Firm* — Fitzpatrick, Cella, Harper & Scinto

(57) ABSTRACT

In order to suitably perform image processing for enhancing edge reproducibility on an image, an image processing apparatus, determines whether or not a pixel of interest in an input image is a pixel configuring an edge, and determines whether or not the pixel of interest in the input image is a pixel configuring a semi-transparent object. In addition, the apparatus performs image processing for enhancing edge reproducibility for the pixel of interest if it is determined that the pixel of interest is a pixel configuring an edge and is not a pixel configuring a semi-transparent object. On the other hand, the apparatus inhibits execution of the image processing for the pixel of interest if it is determined that the pixel of interest is a pixel configuring an edge and is a pixel configuring a semi-transparent object.

9 Claims, 16 Drawing Sheets

FIG. 6
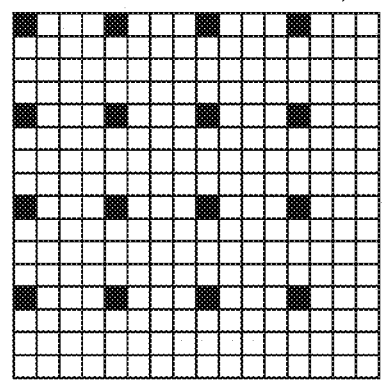
TRANSMITTANCE 95%
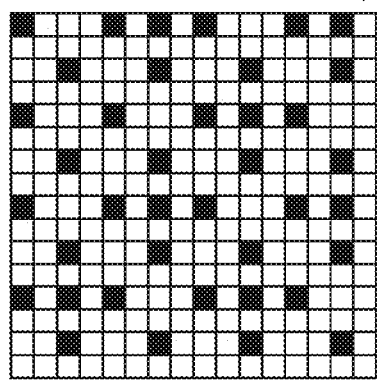
TRANSMITTANCE 85%
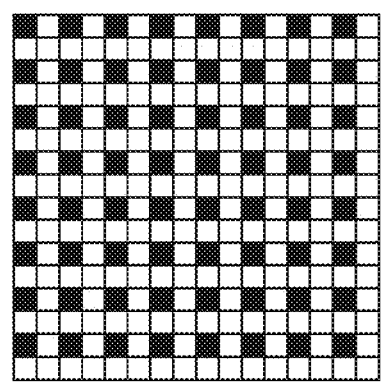
TRANSMITTANCE 75%
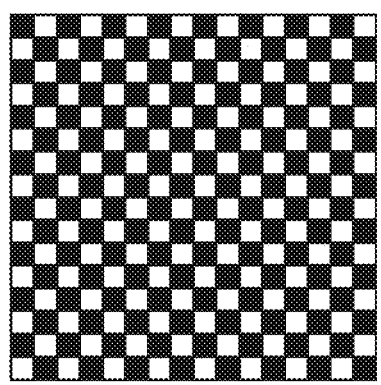
TRANSMITTANCE 50%
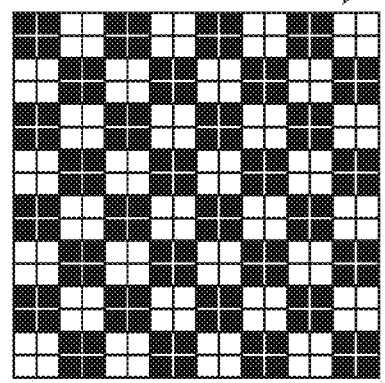
VERTICAL/HORIZONTAL TIMES 2
TRANSMITTANCE 50%
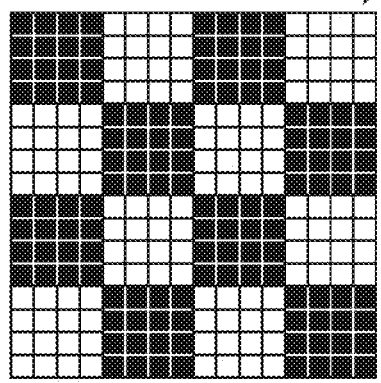
VERTICAL/HORIZONTAL TIMES 4
TRANSMITTANCE 50%

FIG. 7A
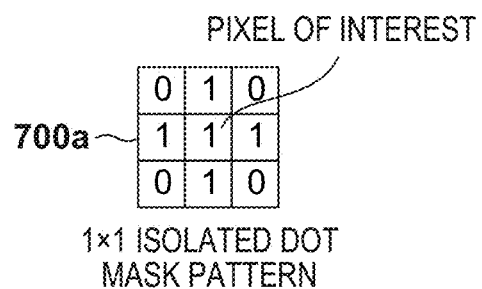
1×1 ISOLATED DOT
MASK PATTERN
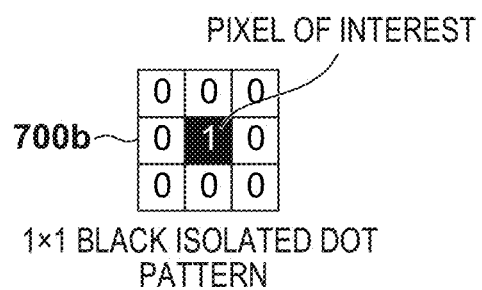
1×1 BLACK ISOLATED DOT
PATTERN
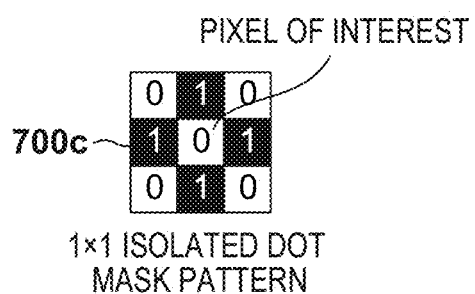
1×1 ISOLATED DOT
MASK PATTERN

FIG. 7B
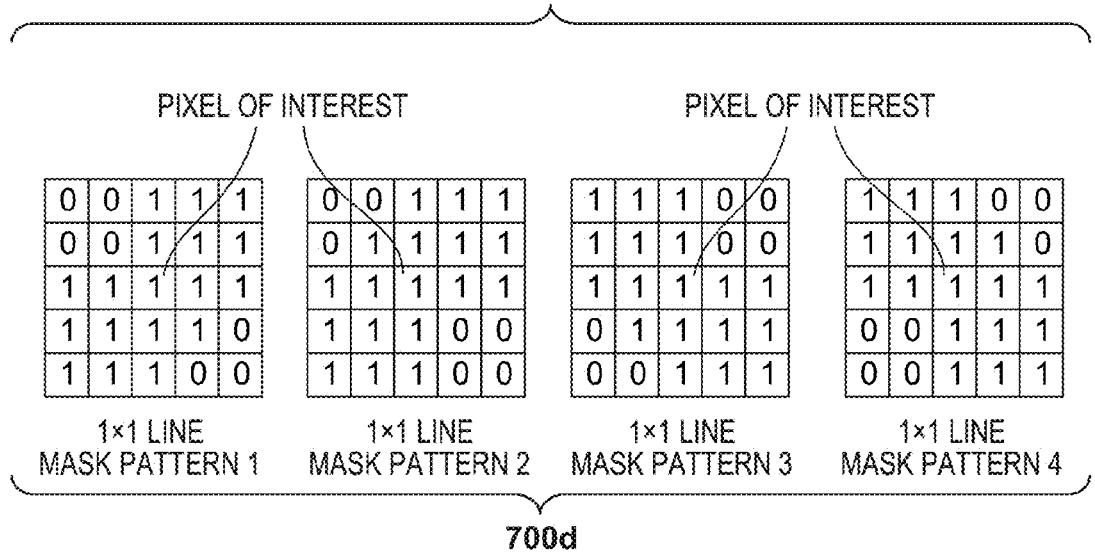
700d
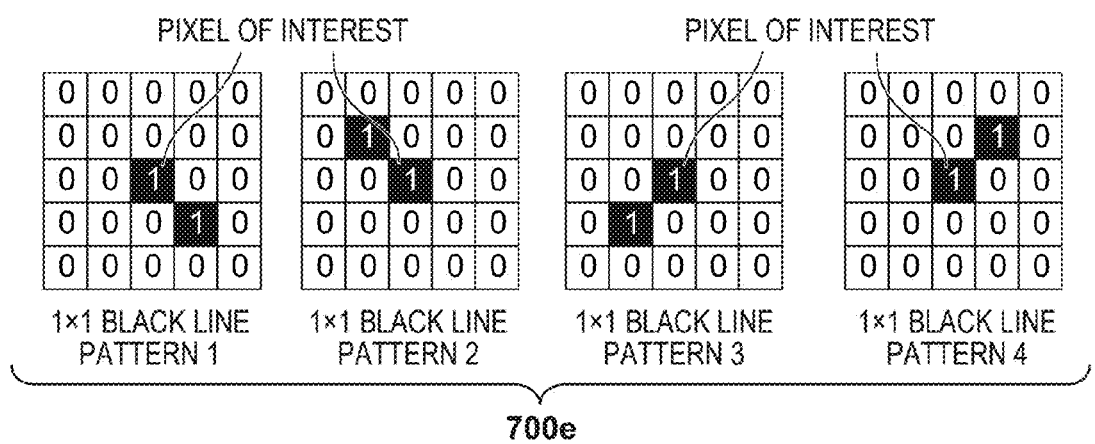
700e
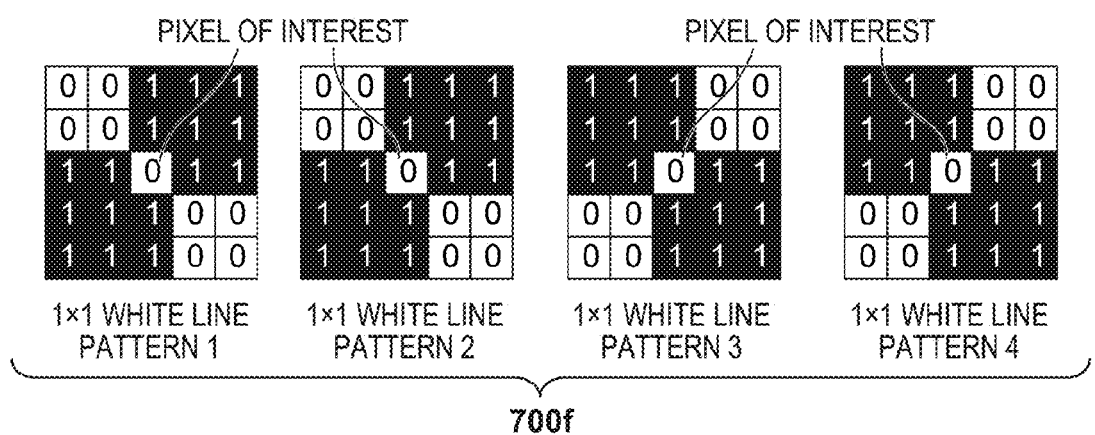
700f

FIG. 7C

PIXEL OF INTEREST

| 0 | 0 | 1 | 1 | 0 |
|---|---|---|---|---|
| 0 | 0 | 1 | 1 | 0 |
| 1 | 1 | 1 | 1 | 1 |
| 1 | 1 | 1 | 1 | 1 |
| 0 | 0 | 1 | 1 | 0 |

2×2 ISOLATED DOT MASK PATTERN 1

| 0 | 1 | 1 | 0 | 0 |
|---|---|---|---|---|
| 0 | 1 | 1 | 0 | 0 |
| 1 | 1 | 1 | 1 | 1 |
| 1 | 1 | 1 | 1 | 1 |
| 0 | 1 | 1 | 0 | 0 |

2×2 ISOLATED DOT MASK PATTERN 2

| 0 | 0 | 1 | 1 | 0 |
|---|---|---|---|---|
| 1 | 1 | 1 | 1 | 1 |
| 1 | 1 | 1 | 1 | 1 |
| 0 | 0 | 1 | 1 | 0 |
| 0 | 0 | 1 | 1 | 0 |

2×2 ISOLATED DOT MASK PATTERN 3

| 0 | 1 | 1 | 0 | 0 |
|---|---|---|---|---|
| 1 | 1 | 1 | 1 | 1 |
| 1 | 1 | 1 | 1 | 1 |
| 0 | 1 | 1 | 0 | 0 |
| 0 | 1 | 1 | 0 | 0 |

2×2 ISOLATED DOT MASK PATTERN 4

700g

PIXEL OF INTEREST

| 0 | 0 | 0 | 0 | 0 |
|---|---|---|---|---|
| 0 | 0 | 0 | 0 | 0 |
| 0 | 0 | 1 | 1 | 0 |
| 0 | 0 | 1 | 1 | 0 |
| 0 | 0 | 0 | 0 | 0 |

2×2 BLACK LINE PATTERN 1

| 0 | 0 | 0 | 0 | 0 |
|---|---|---|---|---|
| 0 | 0 | 0 | 0 | 0 |
| 0 | 1 | 1 | 0 | 0 |
| 0 | 1 | 1 | 0 | 0 |
| 0 | 0 | 0 | 0 | 0 |

2×2 BLACK LINE PATTERN 2

| 0 | 0 | 0 | 0 | 0 |
|---|---|---|---|---|
| 0 | 0 | 1 | 1 | 0 |
| 0 | 0 | 1 | 1 | 0 |
| 0 | 0 | 0 | 0 | 0 |
| 0 | 0 | 0 | 0 | 0 |

2×2 BLACK LINE PATTERN 3

| 0 | 0 | 0 | 0 | 0 |
|---|---|---|---|---|
| 0 | 1 | 1 | 0 | 0 |
| 0 | 1 | 1 | 0 | 0 |
| 0 | 0 | 0 | 0 | 0 |
| 0 | 0 | 0 | 0 | 0 |

2×2 BLACK LINE PATTERN 4

700h

PIXEL OF INTEREST

| 0 | 0 | 1 | 1 | 0 |
|---|---|---|---|---|
| 0 | 0 | 1 | 1 | 0 |
| 1 | 1 | 0 | 0 | 1 |
| 1 | 1 | 0 | 0 | 1 |
| 0 | 0 | 1 | 1 | 0 |

2×2 WHITE LINE PATTERN 1

| 0 | 1 | 1 | 0 | 0 |
|---|---|---|---|---|
| 0 | 1 | 1 | 0 | 0 |
| 1 | 0 | 0 | 1 | 1 |
| 1 | 0 | 0 | 1 | 1 |
| 0 | 1 | 1 | 0 | 0 |

2×2 WHITE LINE PATTERN 2

| 0 | 0 | 1 | 1 | 0 |
|---|---|---|---|---|
| 1 | 1 | 0 | 0 | 1 |
| 1 | 1 | 0 | 0 | 1 |
| 0 | 0 | 1 | 1 | 0 |
| 0 | 0 | 1 | 1 | 0 |

2×2 WHITE LINE PATTERN 3

| 0 | 1 | 1 | 0 | 0 |
|---|---|---|---|---|
| 1 | 0 | 0 | 1 | 1 |
| 1 | 0 | 0 | 1 | 1 |
| 0 | 1 | 1 | 0 | 0 |
| 0 | 1 | 1 | 0 | 0 |

2×2 WHITE LINE PATTERN 4

700i

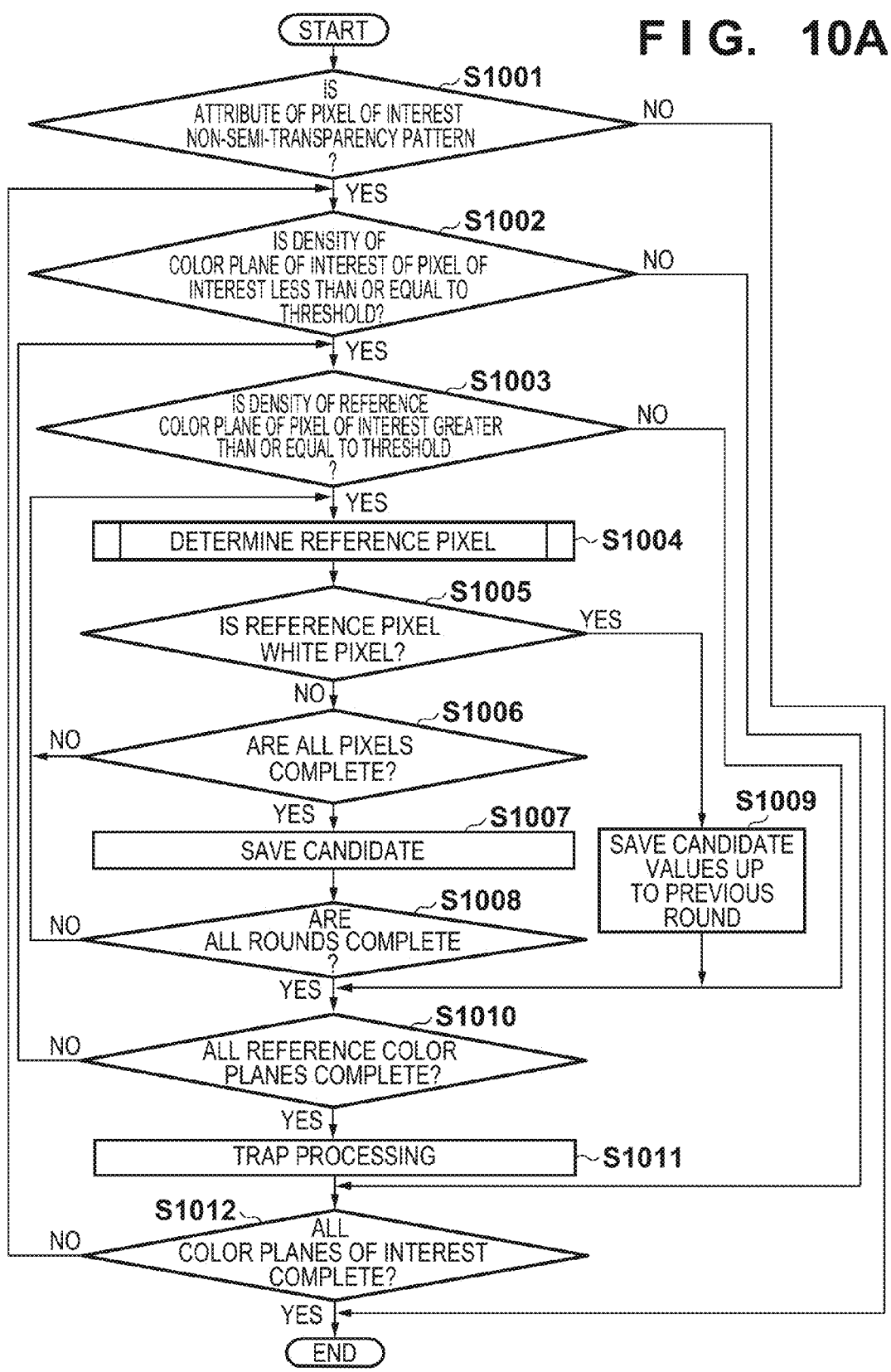
F I G. 10A

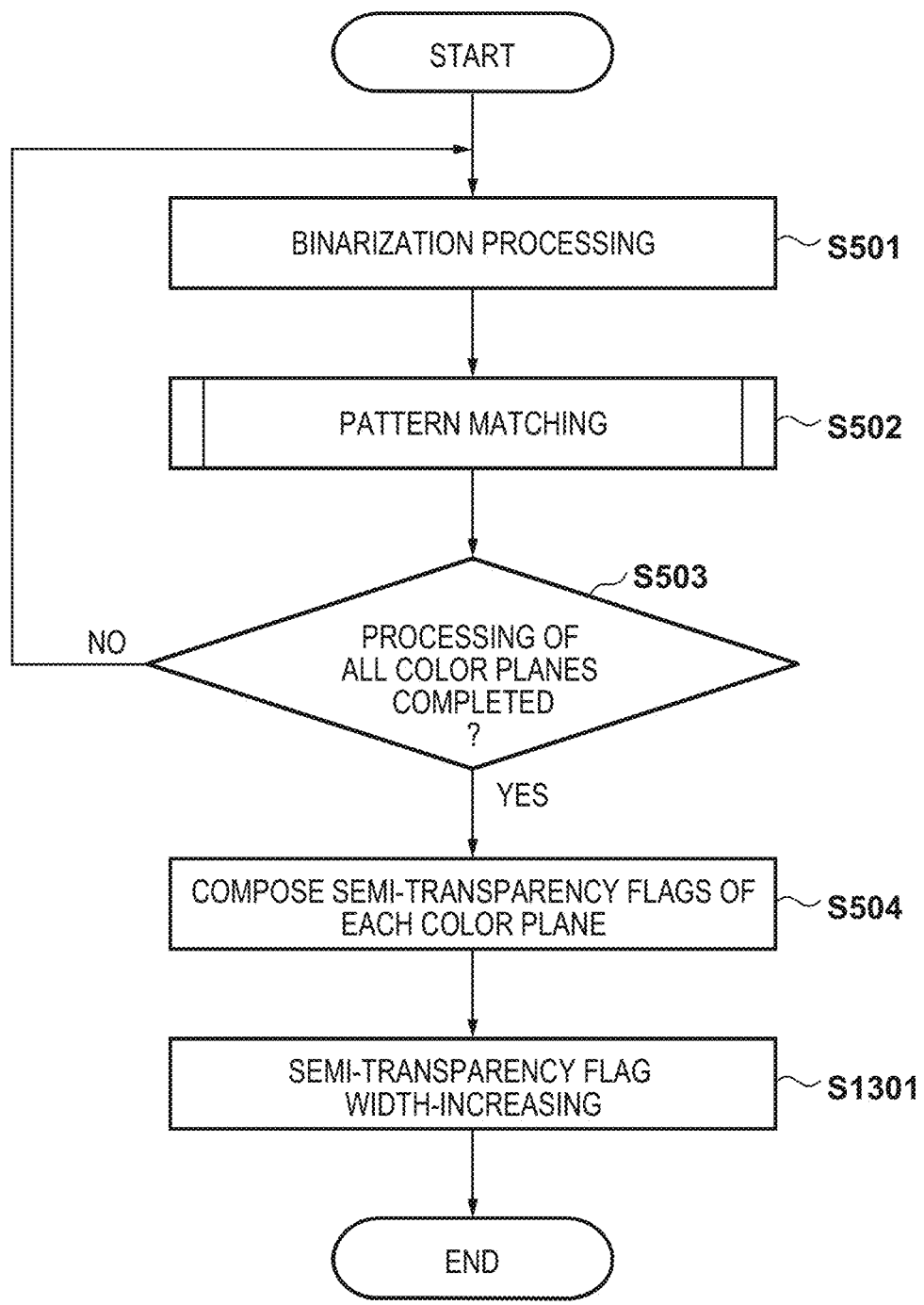

IMAGE PROCESSING APPARATUS AND IMAGE PROCESSING METHOD

BACKGROUND OF THE INVENTION

1. Field of the Invention

The present invention relates to an image processing technique.

2. Description of the Related Art

Techniques for detecting the edge of a line or text for an inputted image are known. Also, in Japanese Patent Laid-Open No. H11-55503, an image processing apparatus that performs an image process (outline processing, or the like) for enhancing a reproducibility of an edge for a pixel which is determined to be on an edge of a line or text in the case of edge detection is disclosed.

Also, there are cases in which a white gap appears between colors of a color print material that are printed on a print medium such as a sheet upon image printing in an image forming apparatus such as a color printing device, and a portion for which a particular color is noticeable, i.e. a "misregistration" occurs. In response to this, in Japanese Patent Laid-Open No. 2007-36699, an image processing apparatus that detects a boundary of colors for an inputted image, and performs trapping processing for preventing an unprinted portion due to a misregistration for a pixel determined to be at a location at which the misregistration could occur has been proposed.

However, there are cases in which image processing for enhancing the reproducibility of an edge should not be performed even for a pixel that is determined to be on an edge of a line or text. An example of this is an edge in an image such as a semi-transparent object which is an object for which a transmittance is set. Specifically, a semi-transparent object is generated as a semi-transparency pattern image for which pixels are thinned in a pattern form in accordance with a transmittance for an object which has normal color values. Thus, a region of a semi-transparency pattern image is determined to be an edge of a line or text, and the image processing for enhancing the reproducibility of the edge is performed. Thus an increase in a density, a change in a color value, or the like, for the pixel occurs due to the outline processing, and a color value becomes denser, and a color becomes different for the image than what it would be if the image were reproduced as it originally should have been.

Also, similarly, when a color boundary detection is performed for a semi-transparency pattern image, a region of the semi-transparency pattern image is determined to be a location at which a misregistration could occur, and trapping processing is performed. Consequently, the color of the semi-transparency pattern is trapped in a text portion, or a color of text is trapped in a semi-transparency pattern portion, and an image having a different color is obtained.

SUMMARY OF THE INVENTION

According to one aspect of the present invention, an image processing apparatus, comprises: a first determination unit configured to determine whether or not a pixel of interest in an input image is a pixel configuring an edge; a second determination unit configured to determine whether or not the pixel of interest in the input image is a pixel configuring a semi-transparent object; and a first image processing unit configured to perform first image processing for enhancing edge reproducibility for the pixel of interest if it is determined that the pixel of interest is a pixel configuring an edge and is not a pixel configuring a semi-transparent object, and configured to inhibit execution of the first image processing for the pixel of interest if it is determined that the pixel of interest is a pixel configuring an edge and is a pixel configuring a semi-transparent object.

According to another aspect of the present invention, an image processing apparatus, comprises: a first determination unit configured to determine whether or not a pixel of interest in an input image is a color boundary pixel at which an unprinted portion occurs when a color misregistration occurs; a second determination unit configured to determine whether or not the pixel of interest in the input image is a pixel configuring a semi-transparent object; and an image processing unit configured to perform image processing for causing an unprinted portion to not be noticeable for the pixel of interest if it is determined that the pixel of interest is a color boundary pixel and is not a pixel configuring a semi-transparent object, and configured to inhibit execution of the image processing for the pixel of interest if it is determined that the pixel of interest is a color boundary pixel and is a pixel configuring a semi-transparent object.

By virtue of the present invention, it is possible to provide a technique by which it is possible to suitably perform trapping processing or image processing to enhance a reproducibility of an edge for an image in which a semi-transparent object exists.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view for showing an example of patterns configuring a semi-transparency pattern image.

FIGS. 7A to 7C are views for showing examples of matching-patterns used for isolated dot or line detection.

FIG. 10A and FIG. 10B are flowcharts for describing processing of a trapping processing unit.

FIG. 13 is a flowchart for describing processing of the semi-transparency pattern determination unit in the second embodiment.

DESCRIPTION OF THE EMBODIMENTS

Hereinafter, suitable embodiments of this invention are described in detail with reference to figures. Note, the following embodiments are only examples and are not intended to limit the scope of present invention.

First Embodiment

An image processing apparatus 100 that executes image processing for enhancing an edge is taken for an example and described below as a first embodiment of an image processing apparatus according to the present invention. In particular, an embodiment to detect a semi-transparency pattern region in an inputted image and to inhibit edge enhancement on the region is described.

<Device Configuration>

Figure 1:
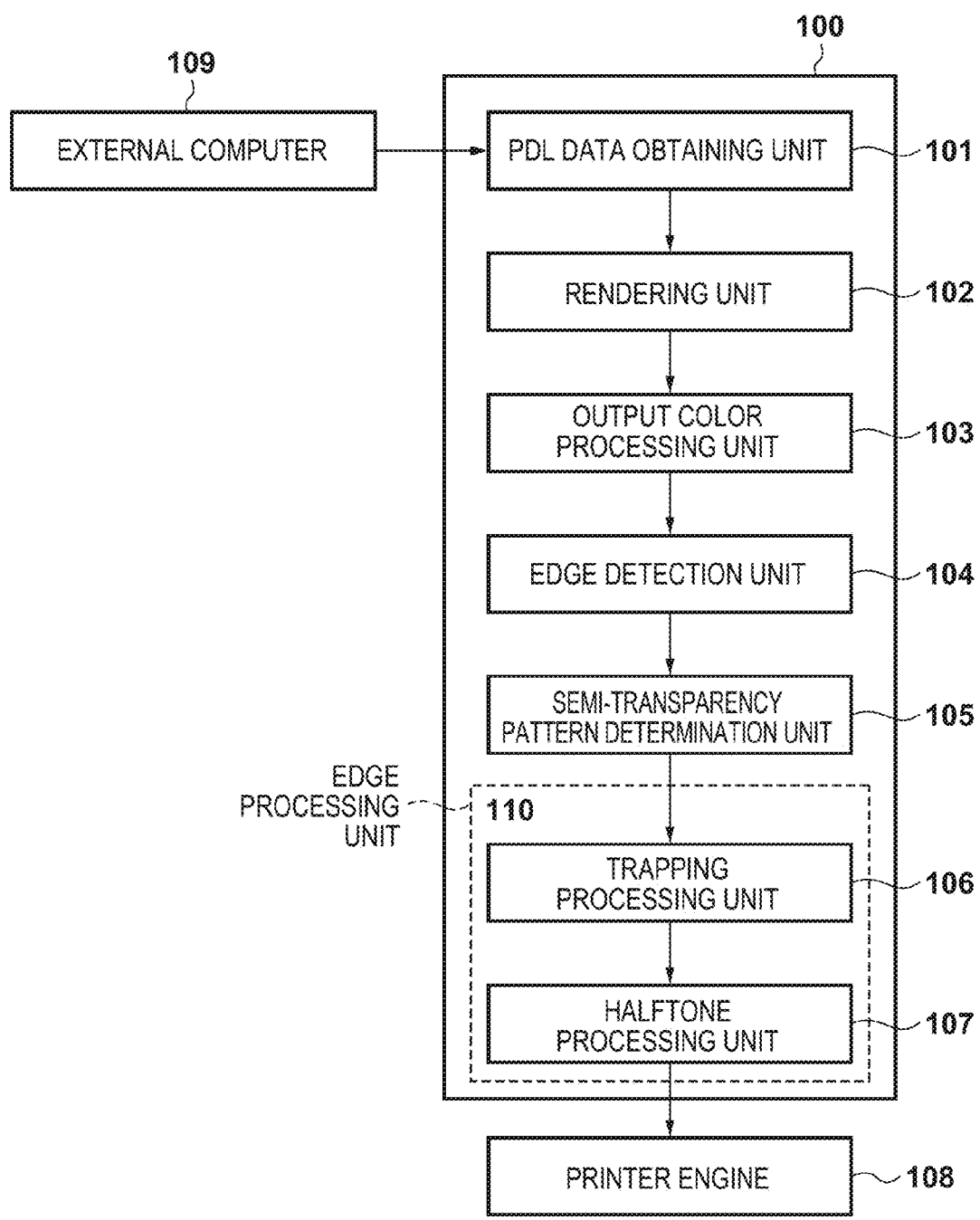
FIG. 1 is a view for showing a configuration of an image processing apparatus according to a first embodiment.

FIG. 1 is a view for showing a configuration of the image processing apparatus 100 according to a first embodiment. The image processing apparatus 100 is comprised of a PDL data obtaining unit 101, a rendering unit 102, an output color processing unit 103, an edge detection unit 104, a semi-transparency pattern determination unit 105, an edge processing unit 110, and a printer engine 108. Note, the edge processing unit 110 is an image processing unit for performing specific processing for an edge included in the input image. The specific image processing is comprised of processing for enhancing edge reproducibility, processing for causing an unprinted portion to not be noticeable (later described trapping processing), or the like. Also, the edge processing unit 110 has a trapping processing unit 106 and a halftone processing unit 107 in the first embodiment.

Also, the image processing apparatus 100 has a CPU (not shown), a ROM and a RAM within it. Programs of the unit are loaded from the ROM by the CPU, and the CPU executes the programs of the units using the RAM as primary storage region.

When the PDL data obtaining unit 101 receives PDL data from an external computer 109, it outputs the PDL data to the rendering unit 102. The PDL data is data composed of a plurality of object rendering commands.

The rendering unit 102 generates a rendered image (RGB image hereinafter) and an attribute image based on the PDL data received from the PDL data obtaining unit 101 and outputs both images to the output color processing unit 103. The attribute image is an image with the same number of pixels as the rendered image, and is an image that holds information (flags) used for image process switching for each pixel.

Figure 2:
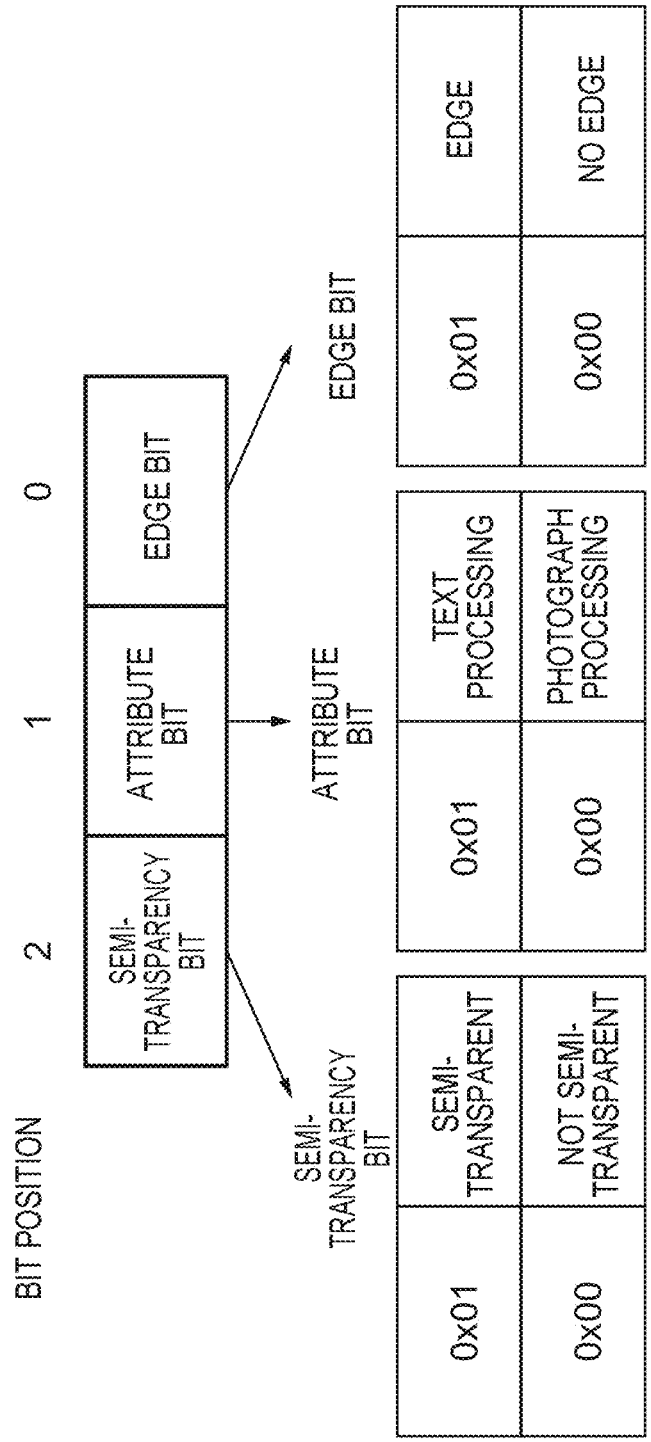
FIG. 2 is a view for illustrating an example of a data configuration of a pixel configuring an attribute image.

FIG. 2 is a view for illustrating an example of a data configuration of a pixel configuring an attribute image. In the example of FIG. 2, the information held by one pixel in the attribute image is composed of a total of 3 bits: a semi-transparency bit (1 bit); an attribute bit (1 bit); and an edge bit (1 bit).

A pixel whose semi-transparency bit is "1" is a pixel configuring a semi-transparency pattern image, and a pixel whose semi-transparency bit is "0" is a pixel not configuring a semi-transparency pattern image.

A pixel whose attribute bit is "1" is a pixel where text processing is performed, and a pixel whose attribute bit is "0" is a pixel where photograph processing is performed.

A pixel whose edge bit is "1" is a pixel configuring an edge on the rendered image, and a pixel whose edge bit is "0" is a pixel not configuring an edge.

Explanation is given for details of attribute image generation. Upon the generation of an attribute image, the rendering unit 102 first performs preparation of an initialized attribute image. The initialized attribute image is data where the semi-transparency bit of all pixels is set to "0" (i.e. not of a semi-transparency pattern), the attribute bit of all pixels is set to "0" (i.e. photograph processing), and the edge bit of all pixels is set to "0" (i.e. not on an edge).

In a case where an object is a text object or a line object, the rendering unit 102 sets an attribute bit corresponding to a pixel position where the object is rendered to "1" (i.e. text processing) for the initialized attribute image. Also, in a case where an object other than a text object or a line object is rendered in the pixel, or in a case where no object is rendered in the pixel, the attribute bit of the pixel is left to be "0" (i.e. photograph processing).

Note, for a pixel where a plurality of objects are rendered, the rendering unit 102 overwrites both the rendered image and the attribute image with information of a rendering command of the last object (the most foreground object) rendered on the pixel.

The output color processing unit 103 receives an RGB image and an attribute image from the rendering unit 102, performs color processing on the RGB image based on the attribute image, and generates a CMYK image. Then, the CMYK image and the attribute image are outputted to the edge detection unit 104.

The edge detection unit 104 receives the CMYK image and the attribute image from the output color processing unit 103 and detects an edge of text or a line in the CMYK image. The attribute image is rewritten by setting the edge bit of a pixel that is detected to be at an edge to "1" (edge). After that, the rewritten attribute image and the CMYK image are outputted to the semi-transparency pattern determination unit 105. Detail of processing of the edge detection unit 104 is explained later with reference to FIG. 3 and FIG. 4.

The semi-transparency pattern determination unit 105 receives the CMYK image and the attribute image from the edge detection unit 104 and detects a semi-transparency pattern image in the CMYK image. Then, the semi-transparency bit of a pixel included in the detected semi-transparency pattern image is set to "1" (semi-transparency pattern). After that, the rewritten attribute image and the CMYK image are outputted to the trapping processing unit 106. Detail of processing of the semi-transparency pattern determination unit 105 is explained later with reference to FIG. 5-FIG. 8.

The trapping processing unit 106 receives a CMYK image and an attribute image from the semi-transparency pattern determination unit 105. Then, trapping processing is performed on a pixel whose semi-transparency bit is "0" and which is determined to be at a color boundary (color boundary pixel). Note, trapping processing is processing for preventing a misalignment of a text printing position of each color plane (CMYK) and an appearance of a white background of the sheet (an unprinted portion) caused by a color misregistration when a printer engine performs image formation. More specifically, trapping processing prevents an unprinted portion even in a case where a color misregistration is generated in the printer engine by slipping in a pixel value of a surrounding pixel to a pixel of interest (trapping). Details of the trapping processing are described later with reference to FIG. 9. The CMYK image to which the trapping processing is performed, and the attribute image received from the edge detection unit 104 are outputted to the halftone processing unit 107.

The halftone processing unit 107 converts a multi-valued CMYK image received from the trapping processing unit 106 to a binary (binarized image) CMYK image, which is a latent image of a color material of the printer engine 108, and outputs the result of the conversion to the printer engine 108. Finally, the printer engine 108 forms each color material on an output medium such as a piece of paper based on the binary CMYK image received from the halftone processing unit 107. Details of this processing are described later.

<Operation of the Edge Detection Unit 104>

As described above, the edge detection unit 104 takes a CMYK image received from the output color processing unit 103 as an input image, and detects the edge of a line or text. Further, the edge detection unit 104 sets the edge bit of a pixel that it detects to be at the edge of a line or text to be "1" (edge). Note that the edge bit of a pixel that is not detected to be at the edge of a line or text is left as "0" (no edge).

Figure 3:
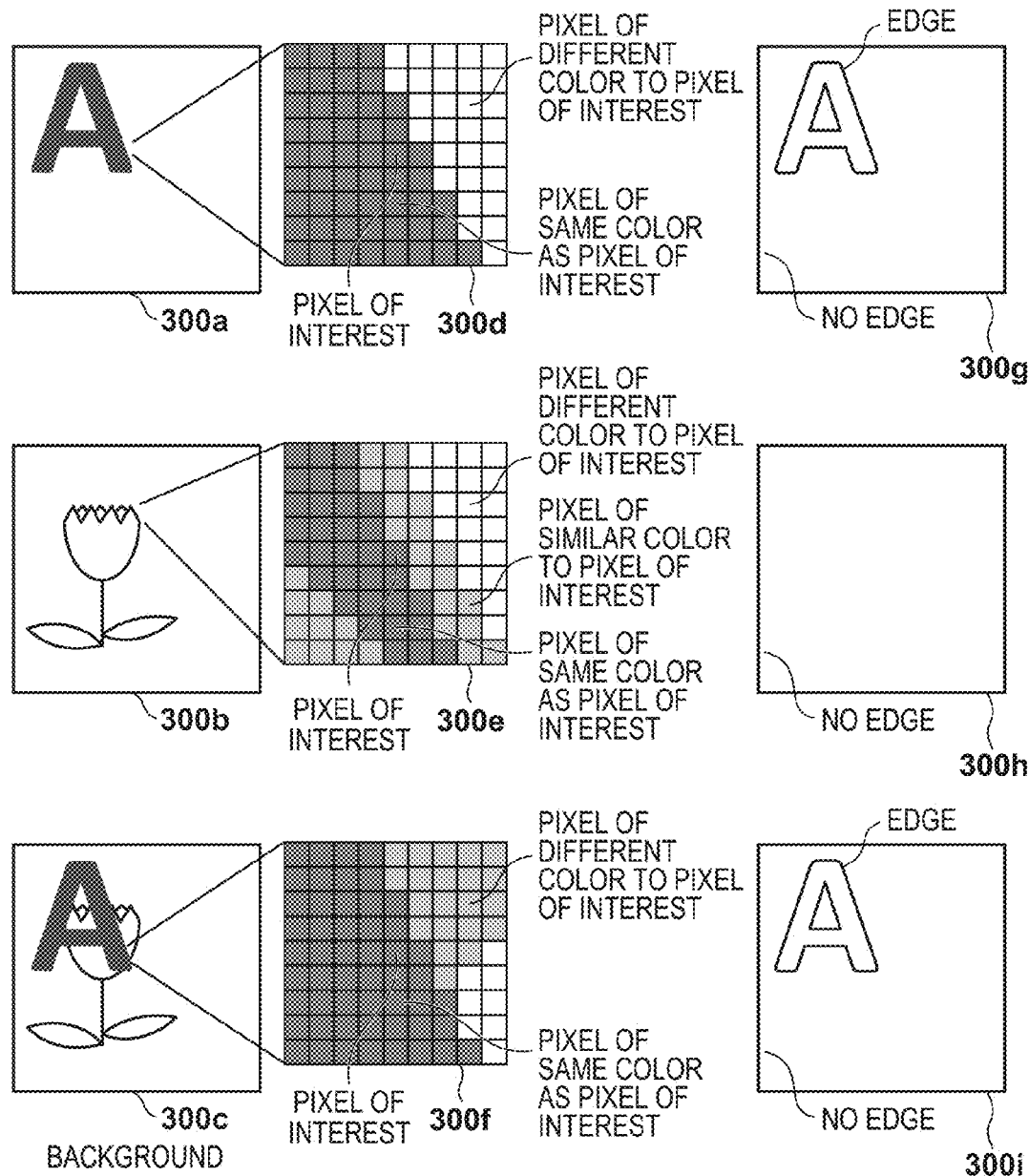
FIG. 3 is a view for explanatorily illustrating edge detection for a CMYK image.

FIG. 3 is a view for explanatorily illustrating edge detection for a CMYK image. An image 300a, an image 300b, and an image 300c conceptually represent a CMYK image in which text is rendered, a CMYK image in which a photograph is rendered, and a CMYK image in which a photograph including text is rendered respectively.

For each of the CMYK images (the images 300a-300c), which are input images, a single pixel is made to be a pixel of interest, and a result of extraction by a 9×9 window of interest of a periphery whose center is a pixel of interest is illustrated explanatorily in the images 300d-300f respectively.

In the image 300d, it can be seen that in a vicinity of an edge of a line or text there are many pixels of the same color as the pixel of interest, and there are few pixels of a similar color to the pixel of interest, and there are many pixels of a different color to the pixel of interest. In the image 300e, it can be seen that at the vicinity of an edge within a photograph, there are few pixels of the same color as the pixel of interest, and there are many pixels of a similar color to the pixel of interest. In the image 300f, it can be seen that in a vicinity of an edge of text in a photograph there are many pixels of the same color as the pixel of interest, and there are few pixels of a similar color to the pixel of interest, and there are many pixels of a different color to the pixel of interest.

Using the characteristics above, the edge detection unit 104 sets the edge bit of the attribute image to "1" in a case where in the periphery of the pixel of interest there are many pixels of the same color as the pixel of interest, and there are few pixels that are similar to the pixel of interest, and there are many pixels of a different color to the pixel of interest. The detection results of the edge detection unit 104 for the rendered images of the images 300a-300c are illustrated in the images 300g-300i. In this way, it is possible to extract an edge of a line or text suitably.

Where there are many pixels of the same color as the pixel of interest that suggests that the pixel of interest is on a line or text. Also, when there are few pixels of a similar color to the pixel of interest, that suggests that there is no gentle density change at the periphery of the pixel of interest, i.e. that it is not a photograph (in other words, it may be text). In addition, when there are many pixels of a different color to the pixel of interest, that suggests that there may be an edge in the periphery of the pixel of interest.

Here, the edge of a line or text is determined only in a case where all 3 of these conditions are satisfied, and because the content of what that they each suggest is different, configuration may be taken so as to use only 1 or 2 of these 3 conditions.

Note that a pixel of the same color (may also be called an identical color) as the pixel of interest means a pixel for which a difference in color (a CMYK value in the current example) to the pixel of interest is less than a threshold A (thA). Also, a pixel of a "similar color" to the pixel of interest means a pixel for which the difference in color to the pixel of interest is greater than or equal to the threshold A but less than a threshold B (thB). Also, a pixel of a different color to the pixel of interest is a pixel for which a difference in color to the pixel of interest is greater than or equal to the threshold B.

Here, various methods for calculating the "difference in color" can be considered, and one of these is a method of obtaining a maximum value of differences ($\Delta C$, $\Delta M$, $\Delta Y$, $\Delta K$) for each color component of the CMYK values of the pixel of interest and the CMYK values of a selected pixel, example. Otherwise, a sum, or a mean-square sum of $\Delta C$, $\Delta M$, $\Delta Y$, $\Delta K$ can be considered, but limitation is not made to this, and any method of calculation by which it is possible to express a color difference may be employed.

Also, it is advantageous that the CMYK values of the pixels are each 8 bits (0-255 in decimal), and that in a case where a maximum value of $\Delta C$, $\Delta M$, $\Delta Y$, $\Delta K$ is used for the method for calculating the color difference, the threshold A be a value that is "2" or more (for example, a value around "16"), and the threshold B be a value of about "64".

However, these values change depending on what kind of calculation equation color conversion is performed by in the output color processing unit 103. For this reason, a designer may set advantageous thresholds in accordance with conditions. Note that advantageous thresholds may be set by making the above described example thresholds A, B a starting point, and adjusting while confirming whether edges are obtained successfully or not.

Note that setting "2" or more rather than "1" as the threshold A to be advantageous envisions a case in which the image is JPEG-compressed. While JPEG compression is not recited particularly in FIG. 1, a system that adds processing for JPEG compression, saving, and decompression between the rendering unit 102 and the output color processing unit 103 can be considered. In such a case, there are times when a subtle unevenness (fluctuation) occurs in colors (pixel values) of a line or text comprised in pixels of colors that are originally completely equivalent (completely identical color). It is possible to reduce the influence of unevenness by setting "2" or more as the threshold A.

Note that "a completely identical color" here differs in meaning to "the same color" as described above. More specifically, a pixel being of a completely identical color to another pixel means that a difference between a color of a particular pixel and a color of another pixel is "0". On the other hand, as described above, a pixel being of the same color to another pixel means that a difference between a color of a particular pixel and a color of another pixel is less than the threshold A. For this reason, depending on the value taken for the threshold A, there are cases in which "a completely identical color"="the same color".

Figure 4:
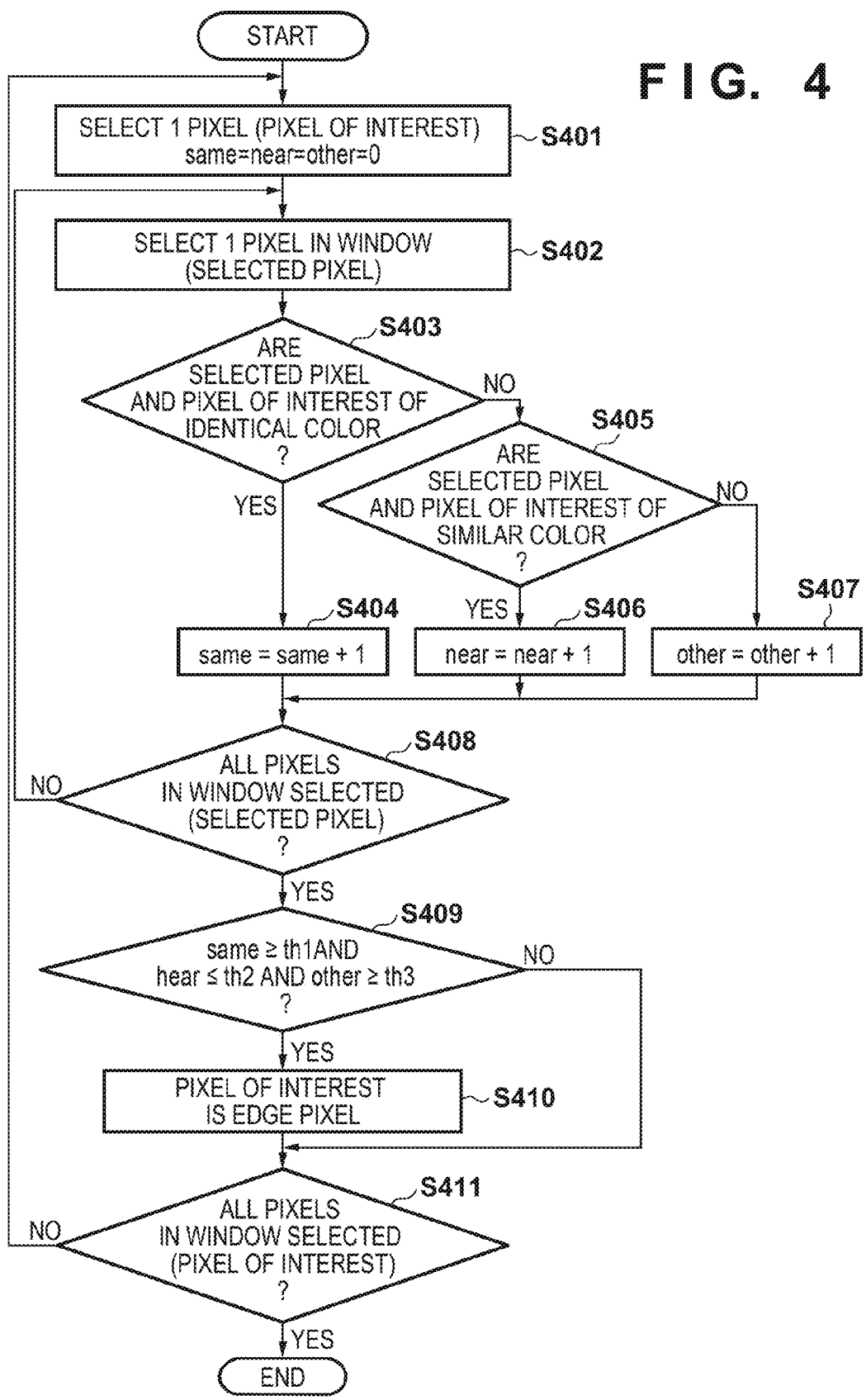
FIG. 4 is a flowchart for describing processing of an edge detection unit.

FIG. 4 is a flowchart for describing processing of the edge detection unit 104.

In step S401, the edge detection unit 104 selects pixels in a CMYK image one at a time in order from the top-left pixel as the pixel of interest. Then, a counter "same" which indicates a number of same-colored pixels, a counter "near" which indicates a number of similar color pixels, and a counter "other" which indicates a number of different color pixels are each set to "0".

In step S402, the edge detection unit 104 selects pixels in a window (of a range of the 9×9 periphery having the pixel of interest as the center, for example) one at a time.

In step S403, the edge detection unit 104 determines whether the selected pixel and the pixel of interest are of an identical color. The edge detection unit 104 adds 1 to "same" if they are of an identical color (if TRUE) (step S404). Meanwhile, if they are not of an identical color (if FALSE), the processing proceeds to step S405.

In step S405, the edge detection unit 104 determines whether the selected pixel and the pixel of interest are of a similar color. If they are similar colors (if TRUE), 1 is added to "near" (step S406). Furthermore, the edge detection unit 104 adds 1 to "other" if they are not of a similar color (if FALSE) (step S407).

In step S408, the edge detection unit 104 determines whether all of the pixels in the window have been determined, and if not all of the pixels have been determined, the processing proceeds to step S402, and an unprocessed pixel is selected. Through the above processing, the number of same-colored pixels, the number of similar color pixels, and the number of different color pixels in the window are counted.

In step S409, the edge detection unit 104 determines whether the number of same-colored pixels≥a threshold 1 (th1), and the number of similar color pixels≤a threshold 2 (th2), and the number of different color pixels≥a threshold 3 (th3). If step S409 is TRUE, the pixel of interest is determined to be on an edge, and an edge bit of the attribute image is set to "1".

In step S411, the edge detection unit 104 determines whether all pixels in a CMYK image have been selected as the pixel of interest. In a case where not all of the pixels have been selected, the processing proceeds to step S401, and 1 unprocessed pixel is selected.

In this way, only an edge of a line or text in a CMYK image is detected by executing the above described processing for all of the pixels in the CMYK image.

Note that it is advantageous that the threshold 1 be a value of about "5", the threshold 2 be a value of about "2" and the threshold 3 be a value of about "5". However, depending on the size of the window, and the setting of the threshold A and the threshold B as described above, the values that are advantageous for these values change. Accordingly, it cannot be said that these are categorically advantageous, and the designer should set advantageous thresholds in accordance with performance of experimentation. Note that advantageous thresholds may be set by making the above described threshold 1-threshold 3 initial values, and adjusting while confirming whether edges can be detected successfully or not.

<Operation of the Semi-Transparency Pattern Determination Unit 105>

The semi-transparency pattern determination unit 105 determines a region in which a semi-transparency pattern image exists. The semi-transparency pattern determination unit 105 sets a window of a predetermined size for a CMYK image, analyzes whether or not pixels in that window has a pattern of the semi-transparency pattern, and in a case where they do have such as pattern, the semi-transparency pattern determination unit 105 sets the semi-transparency bit for a position of a pixel of interest in the center to be "1". By performing this processing while scanning the window for the whole image, it is possible to detect a region in which a semi-transparency pattern image exists.

In a case where document data in which a semi-transparent object exists is printed, PDL data for generating an image for which pixels are thinned for a normal object is generated on the external computer 109 as a rendering command. The rendering unit 102 generates the semi-transparency pattern image for which pixels are thinned based on a rendering command of a semi-transparent object included in the PDL data obtained from the PDL data obtaining unit 101. The semi-transparency pattern image is an image for which pixels are thinned in a pattern form in accordance with a transmittance for an object that has normal color values.

FIG. 6 is a view for showing an example of patterns configuring a semi-transparency pattern image. For example, the rendering unit 102 is configured to render a semi-transparency pattern image at a resolution of 300 dpi. Here, images 600a-600d each illustrate a semi-transparency pattern image for cases in which 95%, 85%, 75%, and 50% are designated respectively as the transmittance. In this way, the semi-transparency pattern is of a different pattern shape for each transmittance, and a pattern is prepared for each transmittance excluding the transmittances of 0% and 100%. The rendering unit 102 generates a semi-transparency pattern image by repetitively allocating a 16×16 matrix pattern as shown in FIG. 6. These pattern images are set so as to have differing phases as expressed by the matrices in accordance with the number of objects rendered, the rendering position, or the like. For example, the patterns illustrated in the images 600a-600d are rendered by repeating the pattern in a state that is shifted M pixels to the right (M: maximum 15 pixels) and N pixels downwards (maximum 15 pixels).

Note that in a case where a resolution of an output apparatus is 600 dpi or 1200 dpi, the rendering unit 102 generates an image such as the images 600e, 600f by magnifying a semi-transparency pattern image generated at the 300 dpi resolution vertically/horizontally by two-times or four-times.

In a case of detecting patterns for each of these transmittances, 16×16×99=25344 patterns are necessary. This is because multiplying 16×16 by 99 patterns corresponds to cases where a phase for which a matrix is arranged is shifted. Here, the semi-transparency patterns grow while maintaining a state of isolated dots for transmittances from 99%-50%, and the state of isolated dots is inverted from 49%-1%. Because of the existence of this characteristic, a pattern matching is performed using matching-patterns illustrated in FIGS. 7A-7C.

FIGS. 7A-7C are a view for showing examples of matching-patterns used for isolated dot or line detection. In particular, the patterns 700a-700c illustrate 3×3 matching-patterns corresponding to 1×1 isolated dots. Also, patterns 700d-700f illustrate line patterns for detecting a line portion. Furthermore, the patterns 700g-700i illustrate matching-patterns for determining 2×2 isolated dot patterns.

The pattern 700a illustrates a mask pattern for a 1×1 isolated dot, and AND processing is performed using the mask pattern on a 3×3 pixel region (binarized image) for which binarization processing is performed (step S501).

The pattern 700b illustrates a matching-pattern for performing a black isolated dot determination for a 1×1 isolated dot. In a case where all pixels of the 3×3 window image processed using the mask pattern and the 1×1 black isolated dot pattern illustrated in pattern 700b match, the semi-transparency flag for the position of the pixel of interest is set to "1". The semi-transparency flag of the position of the pixel of interest is set to "0" if even 1 of the pixels does not match.

The pattern 700c illustrates a matching-pattern for performing a white isolated dot determination for a 1×1 isolated dot. In a case where all of the pixels of the 3×3 window image processed using the mask pattern and the 1×1 white isolated dot pattern match, the semi-transparency flag of the position of the pixel of interest is set to "1" similarly to with the determination for the 1×1 black isolated dot pattern as previously described. The semi-transparency flag of the position of the pixel of interest is set to "0" if even 1 of the pixels does not match.

Here, the semi-transparency pattern when the transmittance is 50% as illustrated in the image 600d, for example, has a pattern in which isolated dots are connected in a diagonal direction and not all of peripheral pixels of the pixel of interest are white ("0"). In order to detect such a semi-transparency pattern, mask pixels are arranged in the top-left, top-right, bottom-left, and bottom-right pixels (4 pixels) as in the mask pattern of pattern 700a. With this, a semi-transparency pattern having a transmittance of 1%-99% can be determined by an isolated dot pattern illustrated in pattern 700*b* and pattern 700*c*.

However, with only the patterns of pattern 700*a*-700*c* (i.e. only an isolated dot determination), a line in a diagonal direction is also determined to be a semi-transparency pattern. Because it is desired that enhancement process be performed on fine text and fine line portions, it is necessary to set the semi-transparency flag of a pixel for which a line portion is determined to be of a semi-transparency pattern to be "0" (not of a semi-transparency pattern).

Patterns 700*d* illustrate mask patterns for detecting a line portion, and patterns 700*e* illustrate 1×1 black line patterns for excluding a line pattern that was determined by a 1×1 black isolated dot pattern. The patterns 700*f* illustrate 1×1 white line patterns for excluding a line pattern that was determined by a 1×1 white isolated dot pattern.

In a case where an isolated dot is determined by the isolated dot patterns illustrated in the patterns 700*a*-700*c*, and it is determined not to be in a line by line patterns illustrated in patterns 700*d*-700*f*, it is determined to be "1" (of a semi-transparency pattern).

Also, as is illustrated in the images 600*e* and 600*f* in the above described FIG. 6, there are cases in which a semi-transparency pattern that is a vertical/horizontal two-times or four-times magnification of a semi-transparency pattern is inputted. The principle of matching itself is similar to the determination of the 1×1 isolated dot pattern, but it is necessary to determine the semi-transparency flag for the 4 pixels of 2×2 isolated dots to generate the semi-transparency flags for the pixel of interest values in the pattern matching.

For this reason, 5×5 window matching-patterns illustrated in patterns 700*g*-700*i* are arranged, and furthermore patterns of shifted phases are applied. With this, it becomes possible to determine that a 2×2 isolated dot pattern is of a semi-transparency pattern. For the 2×2 semi-transparency patterns, similarly to the 1×1 semi-transparency patterns, there are line patterns (not shown) for determining that a line portion is not of a semi-transparency pattern. There are also 4×4 isolated dot patterns and line patterns but because the matching method is similar explanation will be omitted.

Figure 5:
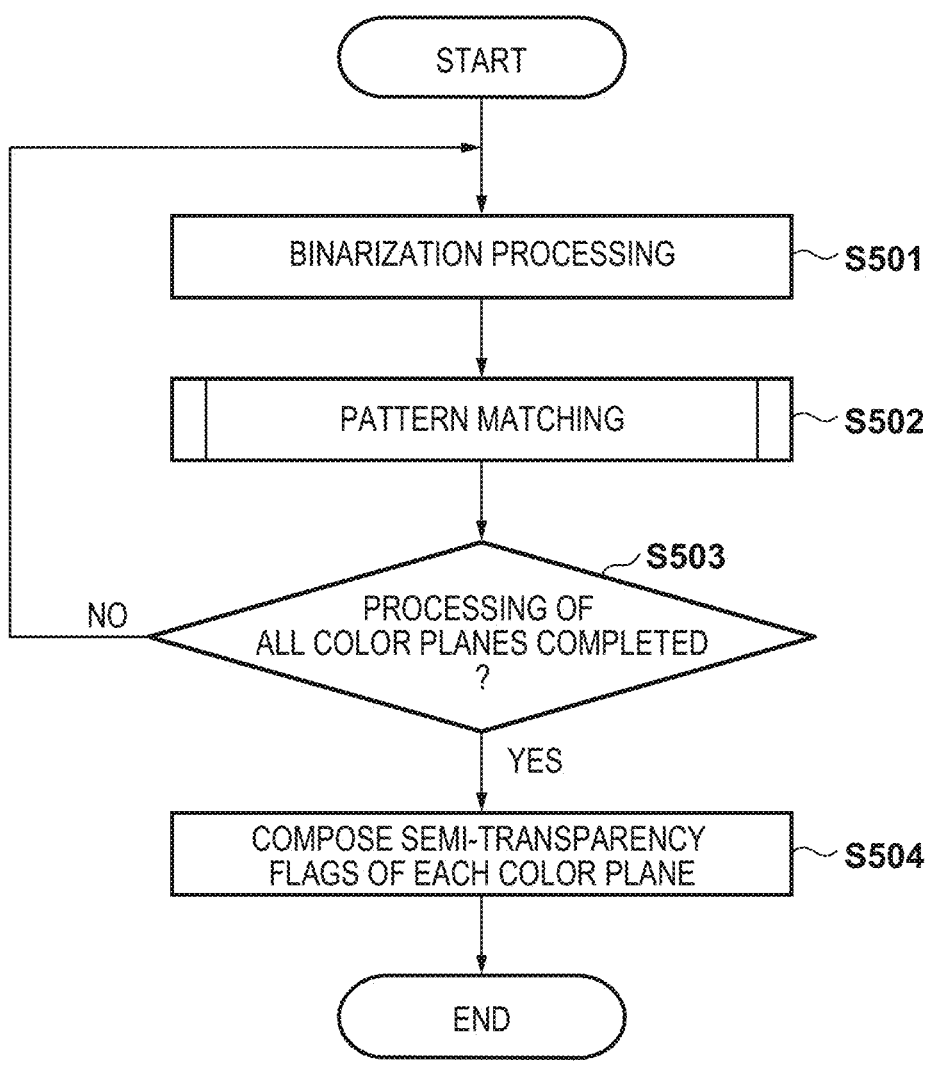
FIG. 5 is a flowchart for describing processing of a semi-transparency pattern determination unit.

FIG. 5 is a flowchart for describing processing of the semi-transparency pattern determination unit 105.

In step S501, the semi-transparency pattern determination unit 105 performs binarization processing for each of C, M, Y and K on pixels of a predetermined window size for a CMYK image. In the binarization processing, binarization processing is performed according to a predetermined threshold. It is desirable that the threshold used in the binarization processing be obtained experimentally from color value differences determined to be edges or color boundaries in the edge detection unit 104 and the trapping processing unit 106. However, the threshold may be set to the value 16, for example. Note that in a case where the threshold is low and noise in a photographic image appears as a result of the binarization processing, generally it will not be a problem even if it is detected to be a semi-transparency pattern because edge enhancement processing, trapping processing, and the like is not executed for a photographic image.

Figure 8:
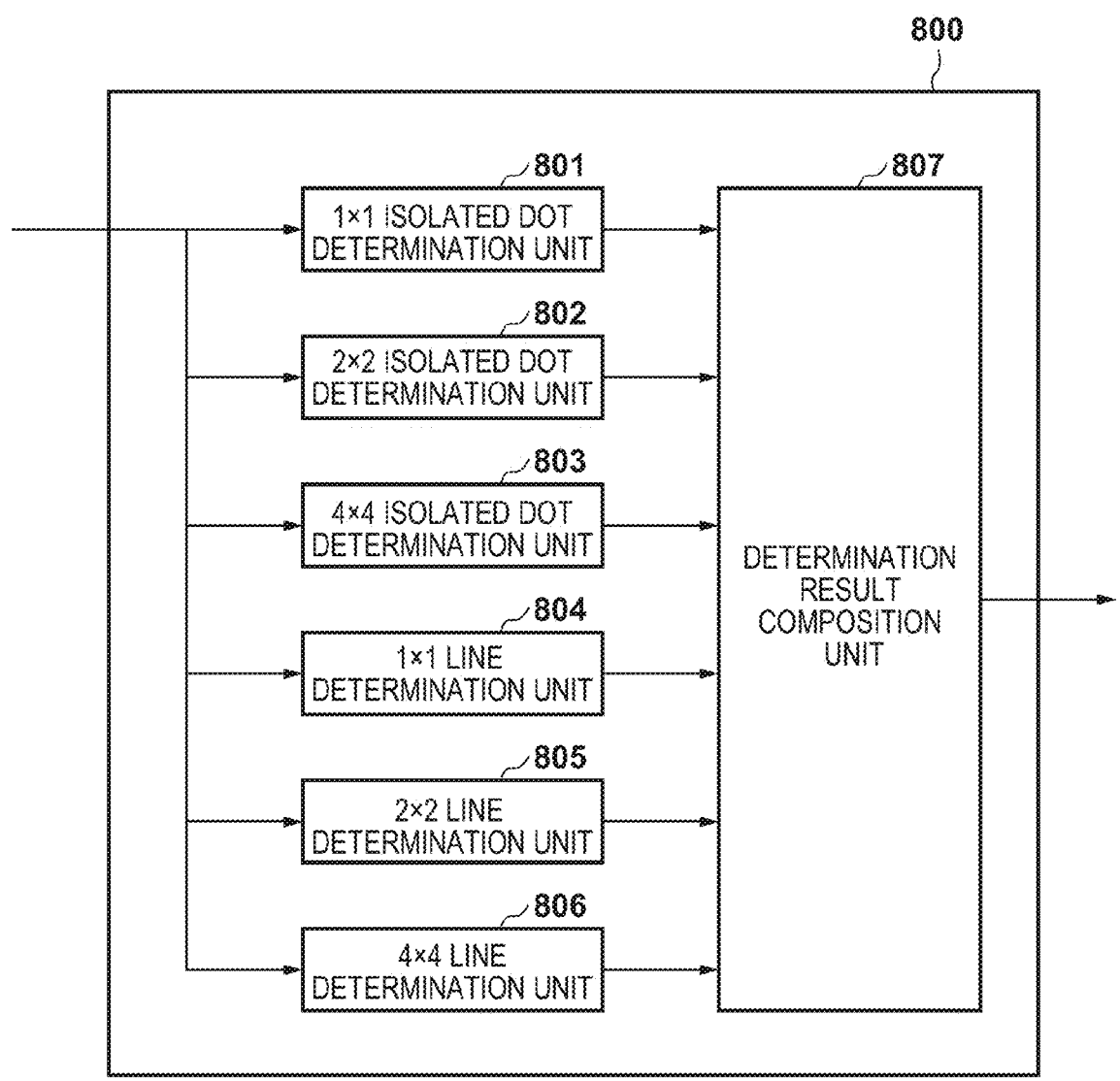
FIG. 8 is a view for showing a configuration of a pattern matching processing unit.

In step S502, the semi-transparency pattern determination unit 105 performs pattern matching processing on an image to which binarization processing is performed. For example, the semi-transparency pattern determination unit 105 performs pattern matching using a pattern matching processing unit 800 which has a configuration as is illustrated in FIG. 8. Specifically, the pattern matching processing unit 800 performs pattern matching using the matching-patterns illustrated in FIGS. 7A-7C, and generates the semi-transparency flag of the position of the pixel of interest.

A 1×1 isolated dot determination unit 801 performs a determination of a 1×1 black isolated dot and a 1×1 white isolated dot using 3×3 window matching-patterns, and outputs a signal (0: non-isolated dot, 1: isolated dot) for which logical OR (OR) processing on these 2 signals is performed.

A 2×2 isolated dot determination unit 802 performs a determination of a 2×2 black isolated dot and a 2×2 white isolated dot using 5×5 window matching-patterns, and outputs a signal (0: non-isolated dot, 1: isolated dot) for which OR processing on these 2 signals is performed.

A 4×4 isolated dot determination unit 803 performs a determination of a 4×4 black isolated dot and a 4×4 white isolated dot using 9×9 window matching-patterns, and outputs a signal (0: non-isolated dot, 1: isolated dot) for which OR processing on these 2 signals is performed.

A 1×1 line determination unit 802 performs a determination of a 1×1 black line and a 1×1 white line using 5×5 window matching-patterns, and outputs a signal (0: line, 1: non-line) for which OR processing on these 2 signals is performed.

A 2×2 line determination unit 805 performs a determination of a 2×2 black line and a 2×2 white line using 7×7 window matching-patterns, and outputs a signal (0: line, 1: non-line) for which OR processing on these 2 signals is performed.

A 4×4 line determination unit 806 performs a determination of a 4×4 black line and a 4×4 white line using 11×11 window matching-patterns, and outputs a signal (0: line, 1: non-line) for which OR processing on these 2 signals is performed.

A determination result composition unit 807 outputs a signal for which AND processing on the output signals from the determination units 801-806 is performed (0: non-semi-transparency pattern, 1: semi-transparency pattern).

In step S503, the semi-transparency pattern determination unit 105 determines whether processing on all of the color planes has completed. If processing on all of the color planes has completed, the processing proceeds to step S504, and if there is a color plane that has not been processed, transition is made to the next color plane, and the processing returns to step S501.

In step S504, the semi-transparency pattern determination unit 105 composes the semi-transparency flags generated for each of the color planes. Here, by performing logical OR (OR) processing on the semi-transparency flags which are the matching results for each of the color planes, a final semi-transparency flag (a semi-transparency bit image) is generated.

By applying the above processing to all of the pixels of the image (CMYK image) shifting the pixel of interest 1 pixel at a time, the semi-transparency bits of the entire attribute image are generated.

<Operation of Trapping Processing Unit 106>

The trapping processing unit 106 detects a boundary of colors, determines whether or not an unprinted portion will occur if a color misregistration occurs, and executes width-increasing of a color plane for a location at which it is determined that an unprinted portion will occur, and thereby performs processing for preventing an unprinted portion even in the case of a color misregistration.

In the trapping processing unit, a window of a predetermined size is applied to a CMYK image, and analysis as to whether a position of a pixel of interest is at a color boundary is performed. Then, if the pixel of interest is at a color boundary, trapping of a color plane of the periphery is performed for the position of the pixel of interest. This processing is performed while scanning the window for the whole image. Here explanation is given for a case of a window of a 7×7 size, but the window size is not limited to 7×7.

Figure 9:
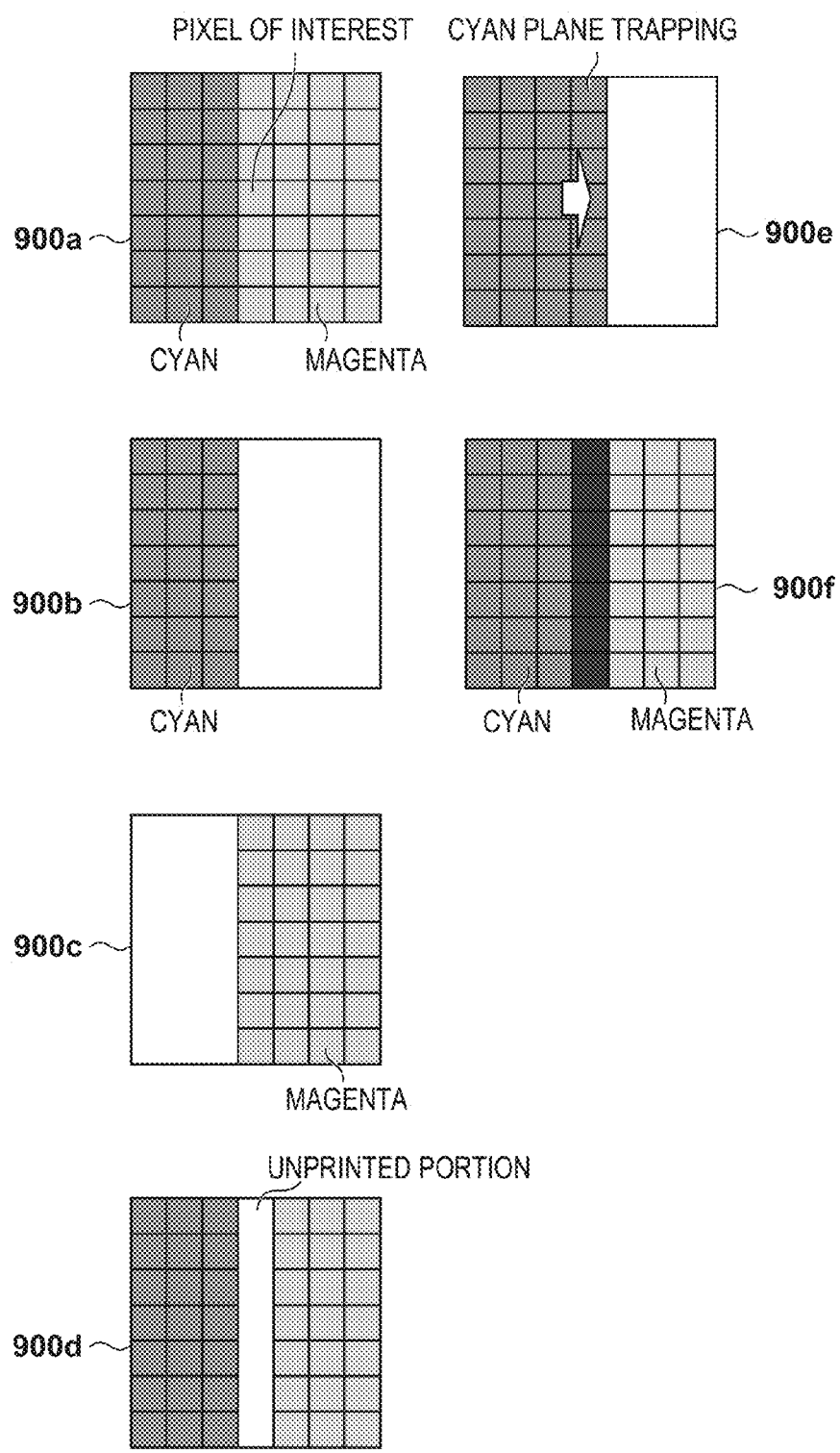
FIG. 9 is a view for showing an example of trapping processing.

FIG. 9 is a view for showing an example of trapping processing. An image 900a illustrates image data comprised of a cyan color and a magenta color. The image 900a can be thought of as something that combines an image of only the cyan plane as is illustrated in image 900b, and an image of only the magenta plane as is illustrated in the image 900c. Thus, if a color misregistration occurs for the image data of the image 900a, an unprinted portion such as is exemplified in image 900d will occur.

Accordingly, trapping the cyan plane for the image 900b as is illustrated in image 900e is considered. As a result, the image combined with the magenta plane is illustrated in image 900f. As is illustrated in the image 900f, by trapping the cyan plane, the occurrence of an unprinted portion at a boundary portion of colors can be prevented even if a color misregistration occurs in the printer engine 108.

Figure 10B:
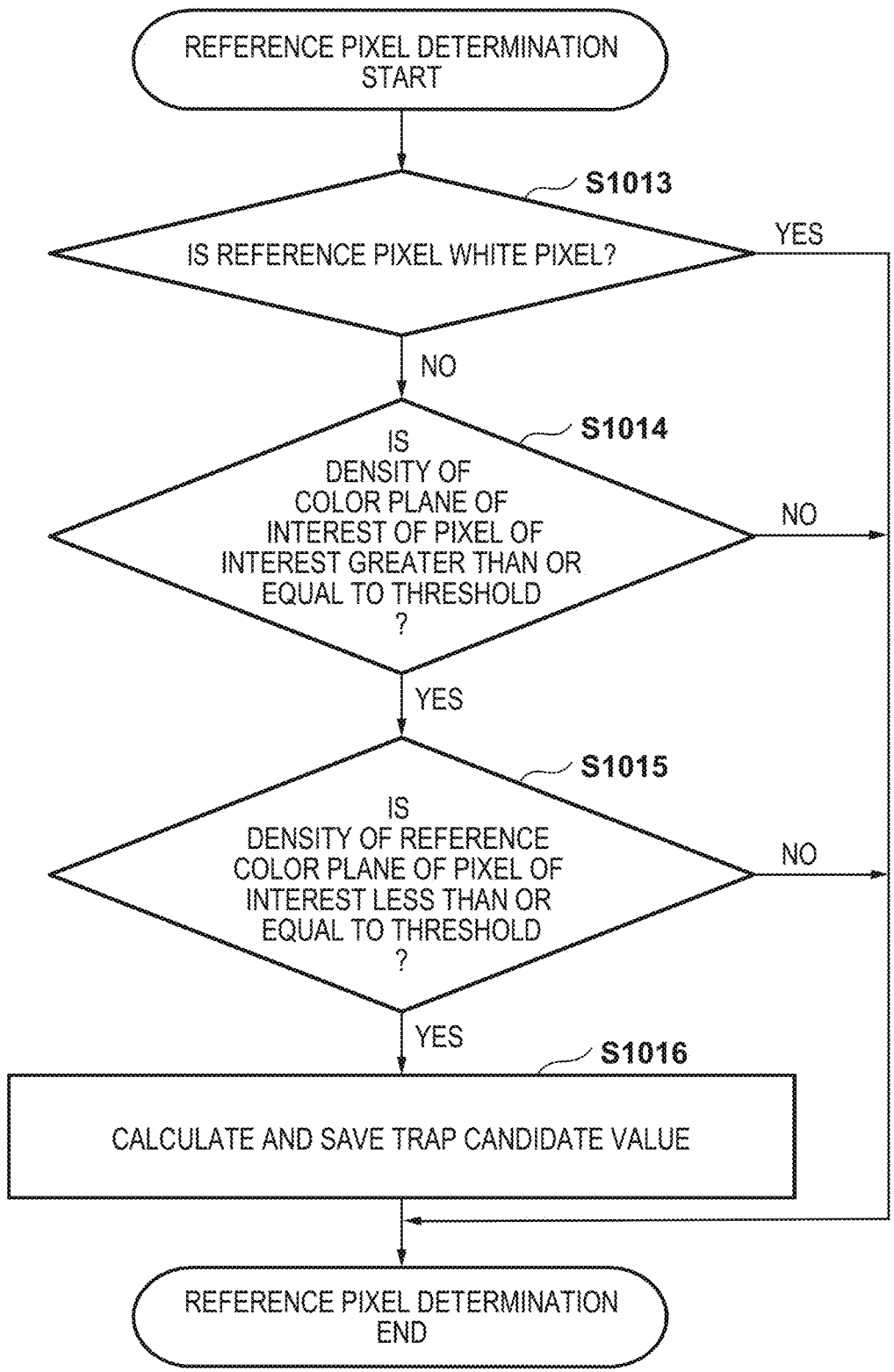

FIG. 10A and FIG. 10B are flowcharts for describing processing of the trapping processing unit 106. In particular, FIG. 10A illustrates an overall flow, and FIG. 10B illustrates a detailed flow of a determination of a reference pixel (step S1004).

In step S1001, the trapping processing unit 106 determines whether the attribute of a pixel of interest is non-semi-transparency pattern. Note that in the trapping processing "the pixel of interest" indicates a center pixel of a predetermined window size, and "reference pixel" indicates a peripheral pixel of the predetermined window size excluding the pixel of interest.

Also, "color plane of interest" indicates color plane that is a target for trapping, and "reference color plane" indicates a color plane that differs to the color plane of interest. In step S1001, if the attribute of the pixel of interest is non-semi-transparency pattern, the processing proceeds to step S1002. If the attribute of the pixel of interest is a semi-transparency pattern, it is determined that this pixel is not a target of trapping processing (a non-target), and the processing completes.

In step S1002, the trapping processing unit 106 determines whether a density of the color plane of interest of the pixel of interest is less than or equal to a threshold (TTCth). In step S1002, if the density of the color plane of interest of the pixel of interest is less than or equal to the threshold (TTCth), it is determined to be a trap target, and the processing proceeds to step S1003. Meanwhile, if the density of the color plane of interest of the pixel of interest exceeds the threshold (TTCth), it is determined that the density of the color plane of interest of the pixel of interest is sufficiently dense, and so there is no need for trapping processing, and the processing proceeds to step S1012.

In step S1003, the trapping processing unit 106 determines whether a density of a reference color plane of the pixel of interest is greater than or equal to a threshold (TRCth). When a color plane is processed in the trapping processing as the color plane of interest, the color planes other than the color plane of interest become reference color planes. For example, if the color plane of interest is cyan, the reference color planes are magenta, yellow, and black. If the density of the reference color plane of the pixel of interest is greater than or equal to the threshold (TRCth), it is determined to be a trap target, and the processing proceeds to step S1004. Meanwhile, if the density of the reference color plane of the pixel of interest is less than the threshold (TRCth), it is determined that trapping processing is not necessary since both the density of the color plane of interest of the pixel of interest and the density of the reference color plane are thin, and the processing proceeds to step S1010.

In step S1004, the trapping processing unit 106 performs determination of a reference pixel. A detailed flow of the determination of the reference pixel (step S1004) will be explained with reference to FIG. 10B.

In step S1013, the trapping processing unit 106 performs a white pixel determination of a reference pixel. If a density of the color plane of interest of the reference pixel is less than a threshold (RTWth), and a density of a reference color plane of the reference pixel is less than a threshold (RRWth), it is determined that the reference pixel is a white pixel, and the determination of the reference pixel completes. If the density of the color plane of interest of the reference pixel is greater than or equal to the threshold (RTWth), and the density of a reference color plane of the reference pixel is greater than or equal to the threshold (RRWth), it is determined that the reference pixel is not a white pixel, and the processing proceeds to step S1014.

In step S1014, the trapping processing unit 106 determines whether the density of the color plane of interest of the reference pixel is greater than or equal to a threshold (RTCth). If the density of the color plane of interest of the reference pixel is greater than or equal to the threshold (RTCth), the processing proceeds to step S1015. Meanwhile, if the density of the color plane of interest of the reference pixel is less than the threshold (RTCth), it is determined that since the density of the target color of the trapping (the color plane of interest) is thin, it is not a pixel for which trapping is used, and the determination of the reference pixel completes.

In step S1015, the trapping processing unit 106 determines whether the density of the reference color plane of the reference pixel is less than or equal to a threshold (RRCth). When the density of the reference color plane of the reference pixel is less than or equal to the threshold (RRCth), since the density of the color plane of interest of the reference pixel is sufficiently dense, and the density of the reference color plane is sufficiently thin, it becomes a trapping color candidate, and the processing proceeds to step S1016. Meanwhile, when the density of the reference color plane of the reference pixel exceeds the threshold (RRCth), it is determined that it is not a pixel for which trapping is used since it has an equivalent color to the pixel of interest, and the determination of the reference pixel completes.

In step S1016, the trapping processing unit 106 calculates and saves a trap candidate value. For the trap candidate value, a density value of the color plane of interest of the reference pixel is applied. Also, when there exist trap candidate values that have been obtained thus far, the trap candidate value obtained this time and the trap candidate values obtained thus far are compared, and the value of the maximum is saved as the trap candidate value, and the processing completes.

In step S1005 the trapping processing unit 106 determines whether or not the reference pixel is determined to be a white pixel in the determination of the reference pixel (step S1004). When the reference pixel is determined to be a white pixel, the processing proceeds to step S1009. Meanwhile, when the reference pixel is determined to not be a white pixel, the processing proceeds to step S1006.

In step S1006, the trapping processing unit 106 determines whether referencing of reference pixels has completed for all pixels for one round. In the trapping processing, the center of the processing window is made to be the pixel of interest, and processing is performed on one pixel of the periphery at a time in units of 1. For example, in a case where the processing window is 7×7 pixels, a 1-pixel periphery adjacent to the pixel of interest is processed in a first round, and when that is finished, referencing is performed in a round 1 more pixel to the outside. The processing is controlled in units of rounds from the inside to the outside of the processing window to the outermost round finally. In step S1006, when it is determined that the referencing of all pixels for 1 round has completed, the processing proceeds to step S1007. When the referencing of all pixels for 1 round has not completed, the processing proceeds to the next reference pixel, and the processing proceeds to step S1004.

In step S1007 the trapping processing unit 106 saves a trap candidate value calculated for 1 round. Also, when there exist trap candidate values that have been obtained thus far, the trap candidate value obtained this time and the trap candidate values obtained thus far are compared, and the value of the maximum is saved as the trap candidate value.

In step S1008, the trapping processing unit 106 determines whether referencing has completed for all rounds for the predetermined window. When referencing of all of the rounds has completed, the processing proceeds to step S1010. When the referencing of all rounds has not completed, the processing proceeds to the next round, and the processing proceeds to step S1004.

In step S1009, the trapping processing unit 106 saves the candidate values for all of the rounds when the reference pixel is determined to be a white pixel in step S1004.

In step S1010, the trapping processing unit 106 determines whether referencing has completed for all reference color planes. When it is determined that the referencing of all of the reference color planes has completed, the processing proceeds to step S1011. If it is determined that the referencing of all reference color planes has not completed, the processing proceeds to the next reference color plane, and the processing proceeds to step S1003.

In step S1011, the trapping processing unit 106 performs trap processing. In the trap processing, the trap candidate value and the density value of the color plane of interest of the pixel of interest are mixed at particular percentages. When inhibiting a sudden change, mixture at a percentage of 50% may be performed. A signal value thus calculated is output as the signal value of the color plane of interest of the pixel of interest. Also, when a trap candidate value is not calculated (trap candidate value=0), the value of the color plane of interest of the pixel of interest is output as is.

In step S1012, the trapping processing unit 106 determines whether referencing has completed for all color planes of interest. If referencing of all of the color planes of interest completes, the process of the trapping processing unit 106 completes. Meanwhile, if a color plane of interest for which referencing is not completed is left, the next color plane of interest is selected, and the processing proceeds to step S1002.

The above processing is applied to all pixels of the image (the CMYK image) while shifting the pixel of interest 1 pixel at a time. By this processing it is possible to not apply trapping processing on a semi-transparency pattern by executing trapping processing for preventing an unprinted portion on portions at which a color boundary occurs. In other words, it is possible to prevent a tint change on an object with which a semi-transparency pattern is overlapped.

<Details of the Halftone Processing Unit 107>

The halftone processing unit 107 references an attribute image for each pixel, and converts a rendered image (a multi-valued CMYK image) into a binary CMYK image. More specifically, the halftone processing unit 107 converts a pixel that is not on an edge (the edge bit is "0") or that is on a semi-transparency pattern (the semi-transparency bit is "1") into binary using a low line number dither. Meanwhile, for a pixel for which the semi-transparency bit is "0" (i.e. non-semi-transparency pattern) and which is on an edge (the edge bit is "1"), a logical OR of a result of converting to binary using a low line number dither, and a result of converting to binary using a dither of a higher number of lines by a high line number dither is made to be a binary conversion result. With this, it is possible to reduce jaggies of an edge of a line or text by a high line number dither while restraining an increase of a density of a semi-transparency pattern by reproducing a semi-transparency pattern image at a low line number.

By virtue of the first embodiment as explained above, a region of a semi-transparent object (a semi-transparency pattern portion) is determined, and control is performed to not apply edge enhancement processing, trapping processing, or the like, on that region. With this, it is possible to suppress a change in tint, an inappropriate increase in the density of a semi-transparent object, or the like.

Second Embodiment

In the second embodiment, explanation will be given of a method by which it is possible to determine appropriately a semi-transparency pattern of a position at which a phase shift occurs even when a semi-transparency pattern rendering phase is shifted.

In the above described first embodiment, explanation was given for an embodiment in which a semi-transparency pattern is determined using matching-patterns corresponding to 1×1, 2×2, and 4×4 size semi-transparency patterns. However, there are cases in which when an object size is large, the object is divided up and transmitted from the external computer 109. Also there are cases in which a rendering phase of a semi-transparency pattern is shifted where a division position is a boundary when the object is a semi-transparent object. Also, there are cases when a rendering phase is similarly shifted at a boundary between objects even when semi-transparency pattern objects are arranged to be lined up.

Figure 11:
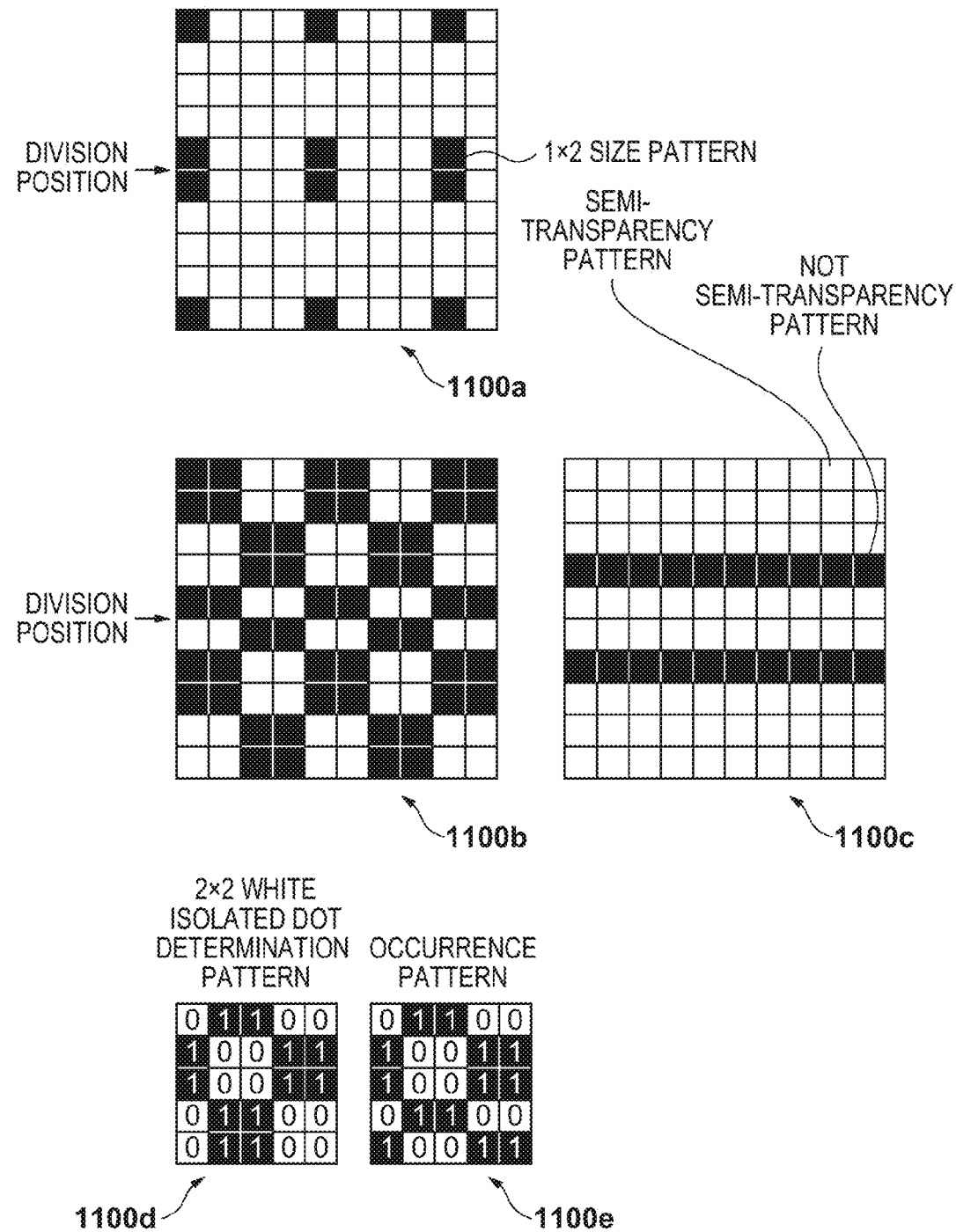
FIG. 11 is a view for showing examples of a semi-transparency pattern under a second embodiment.

FIG. 11 is a view for showing examples of semi-transparency patterns at a division position. As is illustrated in image 1100a, there are cases in which at a division position (a division boundary line) a pattern having normal 1×1 isolated dots is of a form in which the isolated dots become 1×2 or 2×1 at the boundary.

Also, as is illustrated in the image 1100b, when a rendering phase of a 2×2 semi-transparency pattern is shifted, a 1×2 or 2×1 pattern occurs at a division position. However, even in a case where 1×2 and 2×1 semi-transparency patterns are handled, for example, a pattern that is different to normal occurs when the pixels of the lower part of a 2×2 isolated dot that is close to the division position are determined.

Image 1100d is a pattern for detecting a normal 2×2 white isolated dot pattern. Meanwhile, there are cases of a semi-transparency pattern as is illustrated in the image 1100e when the rendering phase is shifted. A result of performing a semi-transparency pattern determination using 2×2, 1×2, 2×1 semi-transparency patterns is illustrated in the image 1100c. As is illustrated in the image 1100c, pixels of a 2×2 semi-transparency pattern close to the division position are not detected correctly as being in the semi-transparency pattern.

In this way, at the periphery of a division position of an object, there are cases in which a semi-transparent object (semi-transparency pattern) is not detected appropriately by the configuration of the first embodiment (FIG. 8). Accordingly, it is necessary to be able to detect appropriately even when the rendering phase of the semi-transparency pattern is shifted.

Figure 12:
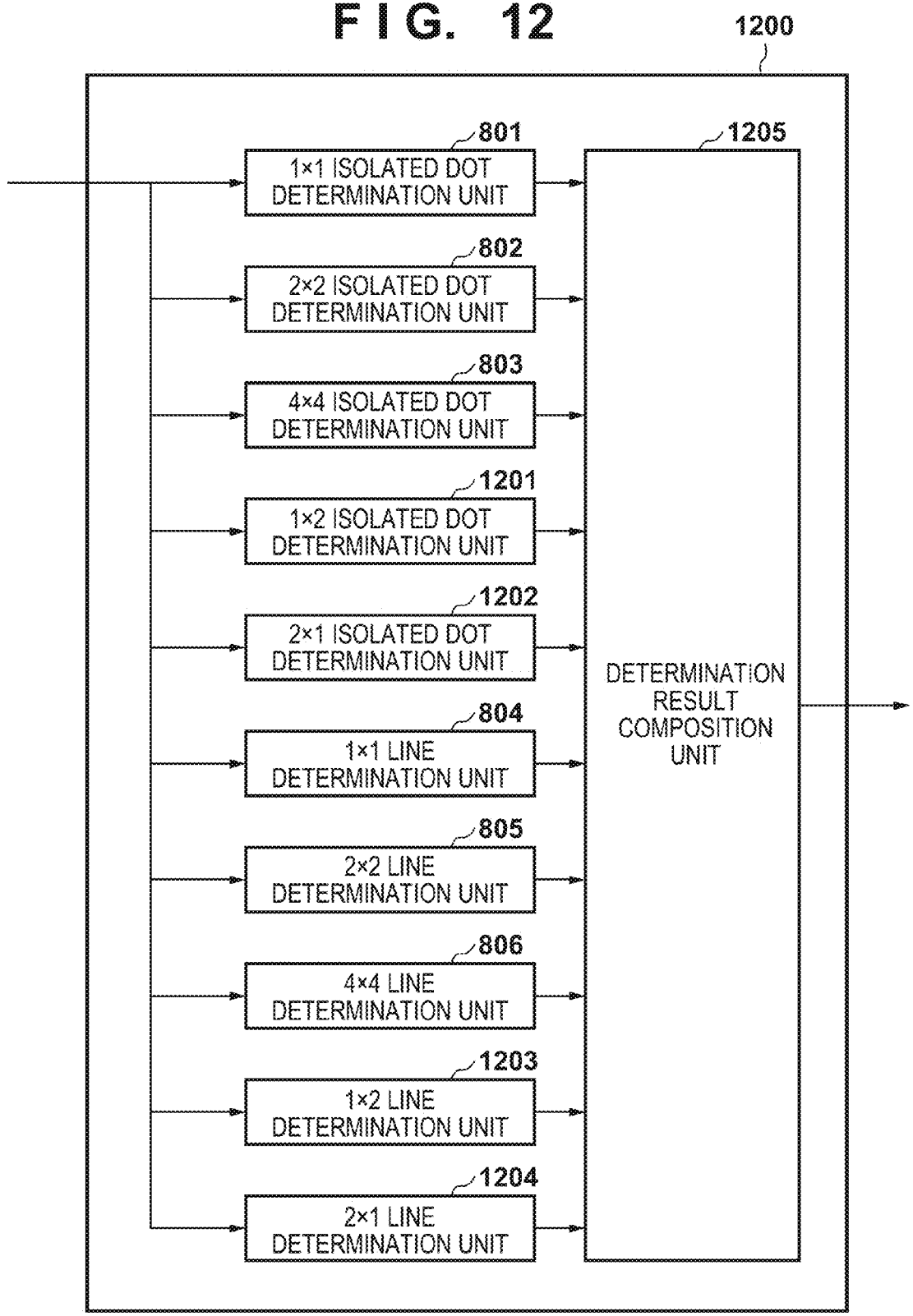
FIG. 12 is a view for showing a configuration of a pattern matching processing unit under the second embodiment.

FIG. 12 is a view for showing a configuration of a pattern matching processing unit 1200 under the second embodiment. Similarly to the case of the first embodiment, the pattern matching processing unit 1200 is a processing unit included in the semi-transparency pattern determination unit 105. Note that the determination units 801-806 in the pattern matching processing unit 1200 are similar to those of the first embodiment (FIG. 8), and so explanation thereof will be omitted.

A 1×2 isolated dot determination unit 1201 performs a 1×2 black isolated dot determination and a 1×2 white isolated dot determination using 3×5 window matching-patterns, and outputs a signal (0: non-isolated dot, 1: isolated dot) for which OR processing on these 2 signals is performed.

A 2×1 isolated dot determination unit 1202 performs a 2×1 black isolated dot determination and a 2×1 white isolated dot determination using 5×3 window matching-patterns, and outputs a signal (0: non-isolated dot, 1: isolated dot) for which OR processing on these 2 signals is performed.

A 1×2 line determination unit 1203 performs a 1×2 black line determination and a 1×2 white line determination using 5×7 window matching-patterns, and outputs a signal (0: line, 1: non-line) for which OR processing on these 2 signals is performed.

A 2×1 line determination unit 1204 performs a 2×1 black line determination and a 2×1 white line determination using 7×5 window matching-patterns, and outputs a signal (0: line, 1: non-line) for which OR processing on these 2 signals is performed.

Here only determination units that handle 1×2 and 2×1 patterns are described, but it is assumed that a determination unit capable of determining a maximum of 4×8 and 8×4 patterns is arranged in order to handle a 1200 dpi resolution.

FIG. 13 is a flowchart for describing processing of the semi-transparency pattern determination unit 105 in the second embodiment. Note that the processing of step S501-step S504 is similar to in the first embodiment and so explanation thereof will be omitted. In step S1301, the semi-transparency pattern determination unit 105 performs width-increasing on and outputs the semi-transparency flags generated in step S504. In other words, width-increasing processing on a region determined to be of a semi-transparency pattern is executed.

In a case where the rendering phase of a 4×4 semi-transparency pattern is shifted, at a maximum a three pixel width cannot be detected. However, by performing 7×7 width-increasing processing, it becomes possible to perform determination appropriately even when the rendering phase of a 4×4 semi-transparency pattern is shifted.

The determination result composition unit 1205 outputs a signal for which AND processing on the output signals from the determination units 801-806 is performed (0: non-semi-transparency pattern, 1: semi-transparency pattern).

As explained above, by virtue of the second embodiment, it becomes possible to detect a semi-transparency pattern appropriately even when the rendering phase of a semi-transparency pattern for a semi-transparent object is shifted at a division boundary portion due to a division of an object. With this, it is possible to suppress a change in tint, an inappropriate increase in the density of a semi-transparent object, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-183500, filed Sep. 9, 2014 which is hereby incorporated by reference herein in its entirety.

What is claimed is:

1. An image processing apparatus, comprising:
a first determination unit configured to determine whether or not a pixel of interest in an input image is a pixel configuring an edge;
a second determination unit configured to determine whether or not the pixel of interest in the input image is a pixel configuring a semi-transparent object; and
a first image processing unit configured to perform first image processing for enhancing edge reproducibility for the pixel of interest if it is determined that the pixel of interest is a pixel configuring an edge and is not a pixel configuring a semi-transparent object, and configured to inhibit execution of the first image processing for the pixel of interest if it is determined that the pixel of interest is a pixel configuring an edge and is a pixel configuring a semi-transparent object.

2. The image processing apparatus according to claim 1, further comprising:
a third determination unit configured to determine whether or not the pixel of interest in the input image is a color boundary pixel at which an unprinted portion occurs when a color misregistration occurs; and
a second image processing unit configured to perform second image processing for causing an unprinted portion to not be noticeable for the pixel of interest if it is determined that the pixel of interest is a color boundary pixel and is not a pixel configuring a semi-transparent object, and configured to inhibit execution of the second image processing for the pixel of interest if it is determined that the pixel of interest is a color boundary pixel and is a pixel configuring a semi-transparent object.

3. The image processing apparatus according to claim 1, wherein
in the input image, the semi-transparent object is rendered as a pattern image in accordance with a transmittance designated for the semi-transparent object.

4. The image processing apparatus according to claim 1, wherein
the second determination unit comprises
a matching unit configured to generate a binarized image for each color component of the input image, and to perform a pattern matching with a predetermined pattern image for a binarized image of each color component; and
a generation unit configured to generate a semi-transparency bit image indicating a region of a semi-transparent object in the input image based on a logical OR of matching results by the matching unit for each color component.

5. The image processing apparatus according to claim 4, wherein
the matching unit comprises
an isolated dot determination unit configured to perform a pattern matching in order to perform a determination as to whether or not a pixel of interest is a pixel configuring an isolated dot;
a line determination unit configured to perform a pattern matching in order to perform a determination as to whether or not a pixel of interest is a pixel configuring a line; and
a composition unit configured to set as a pixel configuring a semi-transparent object a pixel of interest determined to be a pixel configuring an isolated dot by the isolated dot determination unit and determined not to be a pixel configuring a line by the line determination unit.

6. The image processing apparatus according to claim 4, wherein
the generation unit comprises a width-increasing processing unit configured to perform width-increasing processing on a region of a semi-transparent object in the semi-transparency bit image.

7. An image processing apparatus, comprising:
a first determination unit configured to determine whether or not a pixel of interest in an input image is a color boundary pixel at which an unprinted portion occurs when a color misregistration occurs;
a second determination unit configured to determine whether or not the pixel of interest in the input image is a pixel configuring a semi-transparent object; and
an image processing unit configured to perform image processing for causing an unprinted portion to not be noticeable for the pixel of interest if it is determined that the pixel of interest is a color boundary pixel and is not a pixel configuring a semi-transparent object, and configured to inhibit execution of the image processing for the pixel of interest if it is determined that the pixel of interest is a color boundary pixel and is a pixel configuring a semi-transparent object.

8. An image processing method, comprising:
determining whether or not a pixel of interest in an input image is a pixel configuring an edge;
determining whether or not the pixel of interest in the input image is a pixel configuring a semi-transparent object; and
performing image processing for enhancing edge reproducibility for the pixel of interest if it is determined that the pixel of interest is a pixel configuring an edge and is not a pixel configuring a semi-transparent object, and inhibiting execution of the image processing for the pixel of interest if it is determined that the pixel of interest is a pixel configuring an edge and is a pixel configuring a semi-transparent object.

9. A non-transitory computer-readable recording medium storing a program that causes a computer to:
determine whether or not a pixel of interest in an input image is a pixel configuring an edge;
determine whether or not the pixel of interest in the input image is a pixel configuring a semi-transparent object; and
perform image processing for enhancing edge reproducibility for the pixel of interest if it is determined that the pixel of interest is a pixel configuring an edge and is not a pixel configuring a semi-transparent object, and inhibiting execution of the image processing for the pixel of interest if it is determined that the pixel of interest is a pixel configuring an edge and is a pixel configuring a semi-transparent object.

* * * * *